(12) United States Patent
Kubo

(10) Patent No.: US 9,323,087 B2
(45) Date of Patent: Apr. 26, 2016

(54) DISPLAY APPARATUS AND TELEVISION RECEIVER

(71) Applicant: Sharp Kabushiki Kaisha, Osaka (JP)

(72) Inventor: Katsuhiro Kubo, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/419,574

(22) PCT Filed: Jul. 31, 2013

(86) PCT No.: PCT/JP2013/070703
§ 371 (c)(1),
(2) Date: Feb. 4, 2015

(87) PCT Pub. No.: WO2014/024740
PCT Pub. Date: Feb. 13, 2014

(65) Prior Publication Data
US 2015/0219954 A1    Aug. 6, 2015

(30) Foreign Application Priority Data

Aug. 6, 2012 (JP) ................................. 2012-173721

(51) Int. Cl.
*F21V 7/04* (2006.01)
*G02F 1/1333* (2006.01)
(Continued)

(52) U.S. Cl.
CPC .......... *G02F 1/133308* (2013.01); *G02B 6/009* (2013.01); *G02B 6/0088* (2013.01);
(Continued)

(58) Field of Classification Search
CPC ..................... G02F 1/133615; G02F 1/133608

USPC .................................................. 362/632–634
See application file for complete search history.

(56) References Cited

U.S. PATENT DOCUMENTS

2002/0044234 A1* 4/2002 Choi .................... G02B 6/0088
349/65
2006/0028839 A1* 2/2006 Kang ................... G02B 6/0088
362/602
(Continued)

FOREIGN PATENT DOCUMENTS

JP    2008-97877 A    4/2008
JP    2008-186780 A   8/2008
(Continued)

*Primary Examiner* — Sean Gramling
(74) *Attorney, Agent, or Firm* — Chen Yoshimura LLP

(57) ABSTRACT

A liquid crystal display apparatus is provided with: an LED; a liquid crystal panel; a light guide plate having a light input surface; a chassis having a second bottom plate section; a frame; an LED substrate; a heat dissipating member, which is disposed such that the heat dissipating member can slide in the direction orthogonal to the light input surface, the heat dissipating member holding the LED substrate on one plate surface, and having a plate-like attaching section disposed on the second bottom plate section; a side plate section, which is disposed on the side opposite to the light input surface with the attaching section therebetween, the side plate section extending in a board-shape from the frame, and having a through hole; and an adjusting screw, which has a shaft shape, and which penetrates the side plate section through the through hole such that one end of the adjusting screw faces the attaching section, the adjusting screw being capable of bringing the one end closer to the light input surface side when the other end of the adjusting screw is screwed to the side plate section side.

14 Claims, 26 Drawing Sheets

(51) Int. Cl.
*G02F 1/1335* (2006.01)
*H04N 5/64* (2006.01)
*F21V 8/00* (2006.01)
*H04N 5/645* (2006.01)
*H04N 5/655* (2006.01)
*H04N 5/66* (2006.01)

(52) U.S. Cl.
CPC ............ *G02F1/133615* (2013.01); *H04N 5/64* (2013.01); *H04N 5/645* (2013.01); *H04N 5/655* (2013.01); *G02B 6/0085* (2013.01); *G02F 2001/13332* (2013.01); *G02F 2001/133314* (2013.01); *G02F 2001/133317* (2013.01); *G02F 2001/133322* (2013.01); *H04N 5/66* (2013.01)

(56) References Cited

U.S. PATENT DOCUMENTS

| | | |
|---|---|---|
| 2008/0084710 A1 | 4/2008 | Ohno |
| 2008/0180972 A1 | 7/2008 | Sakamoto et al. |
| 2009/0237957 A1 | 9/2009 | Tsubaki |
| 2012/0188485 A1 | 7/2012 | Cheon |
| 2012/0287666 A1* | 11/2012 | Kwon ............... G02F 1/133615 362/602 |

FOREIGN PATENT DOCUMENTS

| | | |
|---|---|---|
| JP | 2009-224301 A | 10/2009 |
| JP | 2012-54108 A | 3/2012 |

* cited by examiner

DISPLAY APPARATUS AND TELEVISION RECEIVER

TECHNICAL FIELD

The present invention relates to a display device and a television receiver.

BACKGROUND ART

In recent years, flat panel display devices that use flat panel display elements such as liquid crystal panels and plasma display panels are replacing cathode ray tube displays in display elements for image display devices such as television receivers, allowing image display devices to be made thinner. Liquid crystal panels used in liquid crystal display devices do not emit light on their own, and therefore, it is necessary to provide a separate backlight device as an illumination device. A known example of such a backlight device is an edge-lit type backlight device in which a light-receiving face is provided as a side face of a light guide plate, and a planar light source such as an LED is provided facing the side face of the light guide plate.

In some cases, edge-lit type backlight devices have support members that support (hold) the light source substrates on which the planar light sources are respectively disposed. This type of support member is disposed on a case such as the chassis. As a result, heat generated in the vicinity of the light source substrate can be effectively dissipated to the case through the support member, thereby realizing a backlight device having an excellent heat dissipating effect. Patent Document 1 discloses a display device including an edge-lit type planar light source device having this type of support member, for example.

RELATED ART DOCUMENT

Patent Document

Patent Document 1: Japanese Patent Application Laid-Open Publication No. 2008-186780

Problems to be Solved by the Invention

However, in display devices that have an edge-lit type planar light source device similar to that in Patent Document 1, there are cases in which the distance between the planar light source and the light guide plate becomes too long due to variation in dimensions of each member and variation in assembly during manufacturing. If the distance between the planar light source and the light guide plate becomes too large, in some cases, dark spots occur in the display surface of the liquid crystal panel that can cause the luminance of the display device to decrease. If this type of decrease in luminance is found after the display device is manufactured, then the display device needs to be disassembled to adjust the distance between the planar light source and the light guide plate, and thus causes a problem in the process of manufacturing the display device or the like.

SUMMARY OF THE INVENTION

The technology disclosed in the present specification was made in view of the above-mentioned problems. The present invention aims at providing a technology whereby the luminance can be adjusted even after the display device is manufactured in a display device having a member that supports the light source substrate.

Means for Solving the Problems

The technology disclosed in the present specification relates to a display device including a light source; a display panel that performs display using light from the light source; a light guide plate disposed behind the display panel to guide light from the light source towards the display panel, the light guide plate having a light-emitting surface on one surface thereof and having a light-receiving face on at least one side face thereof, the light-emitting surface facing a side of the display panel opposite to a display surface side thereof, the light-receiving face facing the light source; a chassis having at least a bottom plate, the chassis being disposed behind the light guide plate; a frame disposed on the display surface side of the display panel, the frame and the chassis housing therebetween the display panel, the light source, and the light guide plate; a light source substrate having the light source disposed on a front surface thereof that faces and is in parallel to the light-receiving face of the light guide plate; a substrate holding member that can slide in a direction perpendicular to the light-receiving face relative to the bottom plate of the chassis, the substrate holding member including at least a plate-shaped portion having a surface for holding a rear surface of the light source substrate; a side wall facing the light-receiving face across the plate-shaped portion of the substrate holding member, the side wall extending from either the chassis or the frame and having a penetrating hole that penetrates the side wall in a thickness direction thereof; and a pillar-shaped member with one end thereof penetrating the penetrating hole engaging the plate-shaped portion of the substrate holding member so that the substrate holding member can be moved towards the light-receiving face by moving another end of the pillar-shaped member towards the side wall.

According to the display device mentioned above, one end of the pillar-shaped member can be moved towards the light-receiving face by moving another end of the pillar-shaped member, and the one end can be attached to the plate surface of the plate shaped portion on the side thereof opposite the side supporting the light source substrate. Then, in this situation, by making the one end of the pillar-shaped member come closer to the light-receiving face, the substrate holding member gets pushed by the pillar-shaped portion, thereby moving the substrate holding member towards the light-receiving face, and thus the light source can be moved closer to the light-receiving face. As a result, after the display device is manufactured, if the luminance in the display surface of the display panel is perceived as dark, then the luminance of the display surface can be increased by decreasing the distance between the light source and the light-receiving face by moving the pillar-shaped member. In this manner, a display device having a member that holds the light source substrate (substrate holding member) can have the luminance thereof adjusted even after the display device is manufactured.

The display device may further include a restricting portion protruding from a portion of the frame exposed between the light source substrate and the light-receiving face towards the chassis, the restricting portion restricting the light source substrate from moving towards the light-receiving face by abutting the front surface of the light source substrate.

According to this configuration, if the light source is moved towards a light-receiving face by moving an end of the pillar-shaped member, then the light source substrate comes into contact with the restricting portion and is suppressed from moving any closer to the light-receiving face, thereby preventing the light source from being too close to the light-receiving face.

The light source substrate may have a rectangular shape, wherein a plurality of the light sources may be aligned in a straight line along a long side direction of the light source substrate, and wherein two of the pillar-shaped members may be respectively disposed only in locations corresponding to two edges of the light source substrate in the long side direction.

According to this configuration, the distance between the respective light sources and light-receiving faces can be adjusted by respectively moving the plurality of pillar-shaped members. As a result, if the luminance of the display surface differs among respective portions corresponding to each light source, then the light sources that correspond to portions with low luminance can be selectively moved closer to the light-receiving face, and thus the luminance of the display surface can be optimized. Furthermore, even if bending occurs in the light source substrate due to heat or the like, the distance between each portion of the light source substrate and the light-receiving face can be adjusted to be equal by changing how much each pillar-shaped member is moved according to how much the light source substrate is bent, and thus the luminance of the display surface can be optimized.

The light source substrate may have a rectangular shape, a plurality of the light sources may be aligned in a straight line along a long side direction of the light source substrate, and a plurality of the pillar-shaped members may be aligned along the long side direction of the light source substrate.

If the light source substrate has a rectangular shape, and if the pillar-shaped members are only disposed on locations that at least correspond to both edges of the light source substrate in the long side direction thereof, then the entire light source substrate can be moved towards the light-receiving face by moving the pair of pillar-shaped members. As a result, with the configuration mentioned above, if the light source substrate has a rectangular shape, then the number of pillar-shaped members provided can be decreased. Therefore, the manufacturing process can be simplified and the cost of the materials related to the pillar-shaped member can be reduced.

Each of the pillar-shaped members may be disposed in a location corresponding to a gap between adjacent light sources.

The gap between adjacent light sources and the portion of the display surface corresponding to the gap is susceptible to becoming dark. In the configuration mentioned above, by disposing pillar-shaped members in locations corresponding to respective gaps between adjacent light sources, the luminance of the locations that becomes dark can be efficiently made brighter, and therefore the luminance of the display surface can be made even.

The penetrating hole may have a groove, and the pillar-shaped member may be a screw that can engage the groove.

According to this configuration, the pillar-shaped member can be moved towards the light-receiving face by screwing the pillar-shaped member into the penetrating hole along the groove thereof. Therefore, the movement distance of the pillar-shaped member can be adjusted more finely compared to a configuration in which the pillar-shaped member itself is a screw or the like by adjusting how much the pillar-shaped member is screwed in. As such, the luminance of the display surface can be adjusted with higher precision.

The substrate holding member may further include a bottom surface portion that extends in a plate shape along the bottom plate of the chassis from an end of the plate shaped portion abutting the bottom plate, a surface of the bottom surface portion abutting the bottom plate, and the bottom surface portion having at least a portion sandwiched between the light guide plate and the bottom plate of the chassis.

According to this configuration, the substrate holding member is held on the bottom plate by having at least a portion of the bottom surface section of the substrate holding member sandwiched between the light guide plate and the bottom plate, and in addition, the substrate holding member can slide in a direction perpendicular to the light-receiving face while being sandwiched. In this manner, a specific configuration in which the substrate holding member can slide in a direction perpendicular to the light-receiving face while being held on the bottom plate can be provided.

The substrate holding member may further include a bottom surface portion that extends in a plate shape along the bottom plate from an end of the plate shaped portion abutting the bottom plate of the chassis, a surface of the bottom surface portion abutting the bottom plate, wherein either the bottom surface portion or the bottom plate has an oval hole having the direction perpendicular to the light-receiving face being a long axis thereof, the oval hole being a penetrating hole for inserting a fastener for attaching the bottom surface portion to the chassis.

According to this configuration, by having the bottom surface portion of the substrate holding member held on the bottom plate through an oval fastening hole, the substrate holding member is held on the bottom plate, and in addition, the attached fastener is loosened from a state of holding the substrate holding member on the bottom plate through the oval fastening hole having an oval shape, and the attached fastener is fastened after the substrate holding member is slid in a direction perpendicular to the light-receiving face (longer axis direction of the oval shaped fastening hole). In this manner, a specific configuration in which the substrate holding member can slide in a direction perpendicular to the light-receiving face while being held on the bottom plate can be provided.

A step may be provided on the bottom plate, wherein an elastic member is disposed between the bottom surface portion of the substrate holding member and a side wall forming the step and contacts the side wall and the bottom surface portion, the elastic member being able to elastically deform in the direction perpendicular to the light-receiving face.

According to this configuration, the elastic member is compressed by moving the pillar-shaped member towards the light-receiving face of the substrate holding member, because the bottom surface section moves towards the side wall, and thus, elastic energy is stored in the elastic member. As a result, if the pillar-shaped member is moved towards a side opposite to the side wall, then the substrate holding member is pushed to a side opposite the light-receiving face by the elastic recovery force of the elastic member, which causes the light source to be farther away from the light-receiving face. Accordingly, if the light source is moved too close to the light-receiving face, then the light source can be moved away from the light-receiving face, and therefore the luminance of the display surface can be adjusted with higher accuracy.

The substrate holding member may further include a protrusion protruding from a rear surface thereof opposite to a side of the plate shaped portion holding the light source substrate, the protrusion protruding towards the side wall of the frame or the chassis in the direction perpendicular to the light-receiving face, wherein the side wall has an engaging groove that can engage the protrusion.

According to this configuration, by having the protrusion of the substrate holding member fitted into an engaging groove, the substrate holding member is held with respect to the side plate of the substrate holding member, and furthermore, because the protrusion protrudes along a direction perpendicular to the light-receiving face, the light-receiving face can slide in the direction perpendicular to the light-receiving face while being held with respect to the side plate. In this manner, a specific configuration can be provided in which the substrate holding member can slide in a direction perpendicular to the light-receiving face while being held to the side plate.

The frame may be constituted of a panel pressing portion that presses the display panel from the display surface side, and a side wall portion that protrudes from a periphery of the panel pressing portion towards the chassis, wherein either the light guide plate or the side wall portion has a protrusion protruding towards another of the light guide plate or the side wall portion, a recess being provided at a location facing this protrusion and having an opening that corresponds to the protrusion, the recess being able to engage the protrusion.

According to this configuration, by joining the protrusion and the recess, the position of the light guide plate can be fixed between the frame and the chassis along the plate surface direction thereof. As a result, the light guide plate becomes less likely to shift, and the distance between the light source and the light-receiving face can be adjusted more accurately.

A gap may be provided between the protrusion and the recess, wherein a plate spring that is elastically deformable is disposed in the gap in a direction perpendicular to the light-receiving face of the light guide plate.

According to this configuration, if the light guide plate vibrates or the like, then the spring plate absorbs the vibration and suppresses the light guide plate from moving. As a result, the light guide plate can be made less likely to shift position.

According to the technique disclosed in the present specification, a display device that uses a liquid crystal panel having liquid crystal in the display panel is novel and useful. A television receiver that includes the above-mentioned display device is also novel and useful.

Effects of the Invention

According to the technology disclosed in the present specification, the luminance of a display device having a member that holds the light source substrate can be adjusted even after the display device is manufactured.

DETAILED DESCRIPTION OF EMBODIMENTS

Embodiment 1

Embodiment 1 will be described with reference to the drawings. In the present embodiment, a liquid crystal display device (an example of a display device) 10 will be described as an example. Each of the drawings indicates an X axis, a Y axis, and a Z axis in a portion of the drawings, and each of the axes indicates the same direction for the respective drawings. The Y axis direction corresponds to the vertical direction and the X axis direction corresponds to the horizontal direction. Unless otherwise noted, "up" and "down" in the description is based on the vertical direction.

Figure 1:
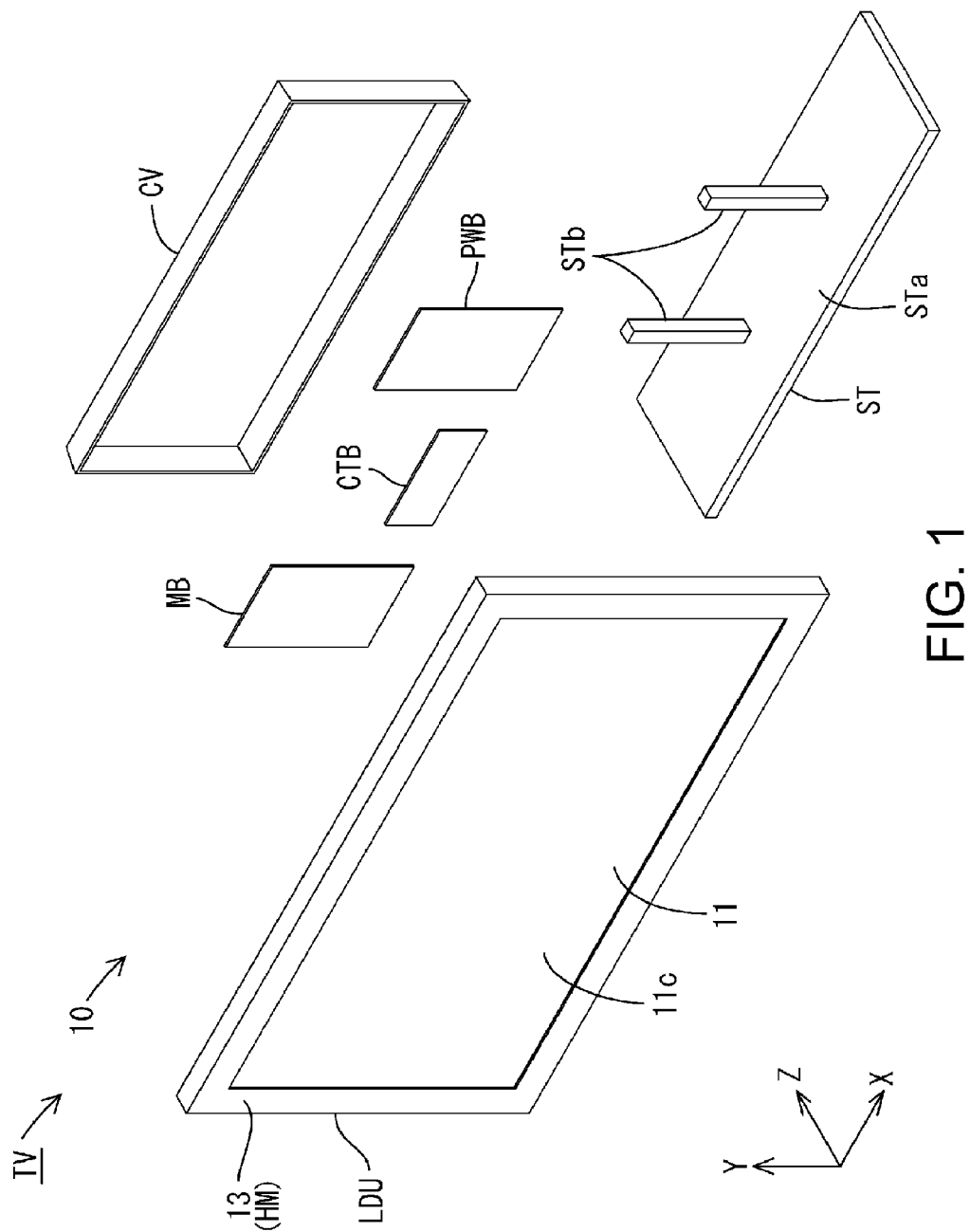
FIG. 1 is an exploded perspective view showing a schematic configuration of a television receiver TV and a liquid crystal display unit LDU of Embodiment 1.
Figure 2:
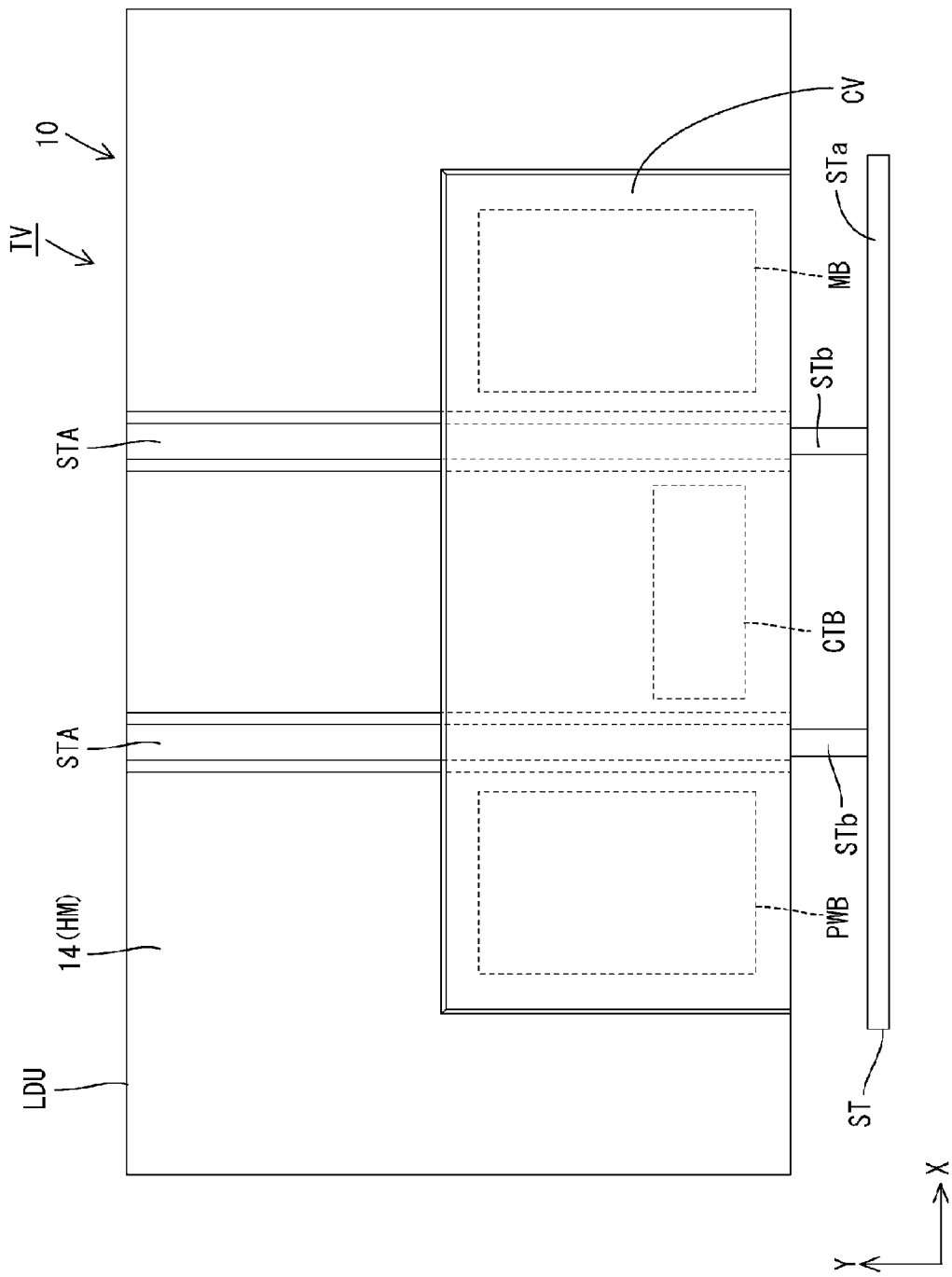
FIG. 2 is a rear view of the television receiver TV and a liquid crystal display device 10.

A television receiver TV is constituted of: a liquid crystal display unit LDU; various types of boards PWB, MB, and CTB attached to the back side (rear side) of the liquid crystal display unit LDU; a cover member CV attached to the back side of the liquid crystal display unit LDU and covering the various types of boards PWB, MB, and CTB; and a stand ST. The stand ST holds the television receiver TV such that the display surface of the liquid crystal display unit LDU is held along the vertical direction (Y axis direction). The liquid crystal display device 10 of the present embodiment is the portion excluding the configuration for receiving television signals (such as a tuner part of a main board MB) from the television receiver TV having the above-mentioned configuration. As shown in FIG. 2, the liquid crystal display unit LDU has a horizontally-long quadrilateral shape (rectangular) as a whole, and includes a liquid crystal panel 11, which is a display panel, and a backlight device 12, which is an external light source. These are integrally held together by a frame 13 and a chassis 14, which are external members that constitute the exterior of the liquid crystal display device 10. The chassis 14 of the present embodiment constitutes one of the exterior members and is also a part of the backlight device 12.

First, the configuration of the rear side of the liquid crystal display device 10 will be explained. As shown in FIG. 2, on the rear of the chassis 14 that constitutes the rear exterior of the liquid crystal display device 10, a pair of stand attachment members STA extending along the Y axis direction is attached at two locations that are separated from each other along the X axis direction. The cross-sectional shape of these stand attachment members STA has a substantially channel shape that opens toward the chassis 14, and a pair of support columns STb of the stand ST is inserted into respective spaces formed between the stand attachment members STA and the chassis 14, respectively. Wiring members (such as electric wires) connected to an LED substrate (an example of a light source substrate) 18 of the backlight device 12 run through a space inside of the stand attachment members STA. The stand ST is constituted of a base STa that is disposed in parallel with the X axis direction and the Z axis direction, and the pair of support columns STb standing on the base STa along the Y axis direction. The cover member CV is made of a synthetic resin, and is attached so as to cover approximately a half of the lower part of the rear side of the chassis 14 of FIG. 2, while crossing over the pair of stand attachment members STA along the X axis direction. Between the cover member CV and the chassis 14, a component housing space is provided to house the components mentioned below such as the various boards PWB, MB, and CTB.

As shown in FIG. 2, the various boards PWB, MB, and CTB include a power supply board PWB, the main board MB, and a control board CTB. The power supply board PWB is a power source for the liquid crystal display device 10, and can supply driving power to other boards MB and CTB, LEDs 17 of the backlight device 12, and the like. Therefore, the power supply board PWB doubles as an LED driver board that drives the LEDs 17. The main board MB has at least a tuner part that can receive television signals, and an image processing part that performs image-processing on the received television signals (neither the tuner part nor the image processing part is shown in the figure), and can output the processed image signals to the control board CTB described below. When the liquid crystal display device 10 is connected to an external video playback device that is not shown, an image signal from the video playback device is inputted into the main board MB, and the main board MB can output the image signal to the control board CTB after processing the signal at the image processing part. The control board CTB has the function of converting the image signal inputted from the main board to a signal for driving liquid crystal, and supplying the converted signal for liquid crystal driving to the liquid crystal panel 11.

Figure 3:
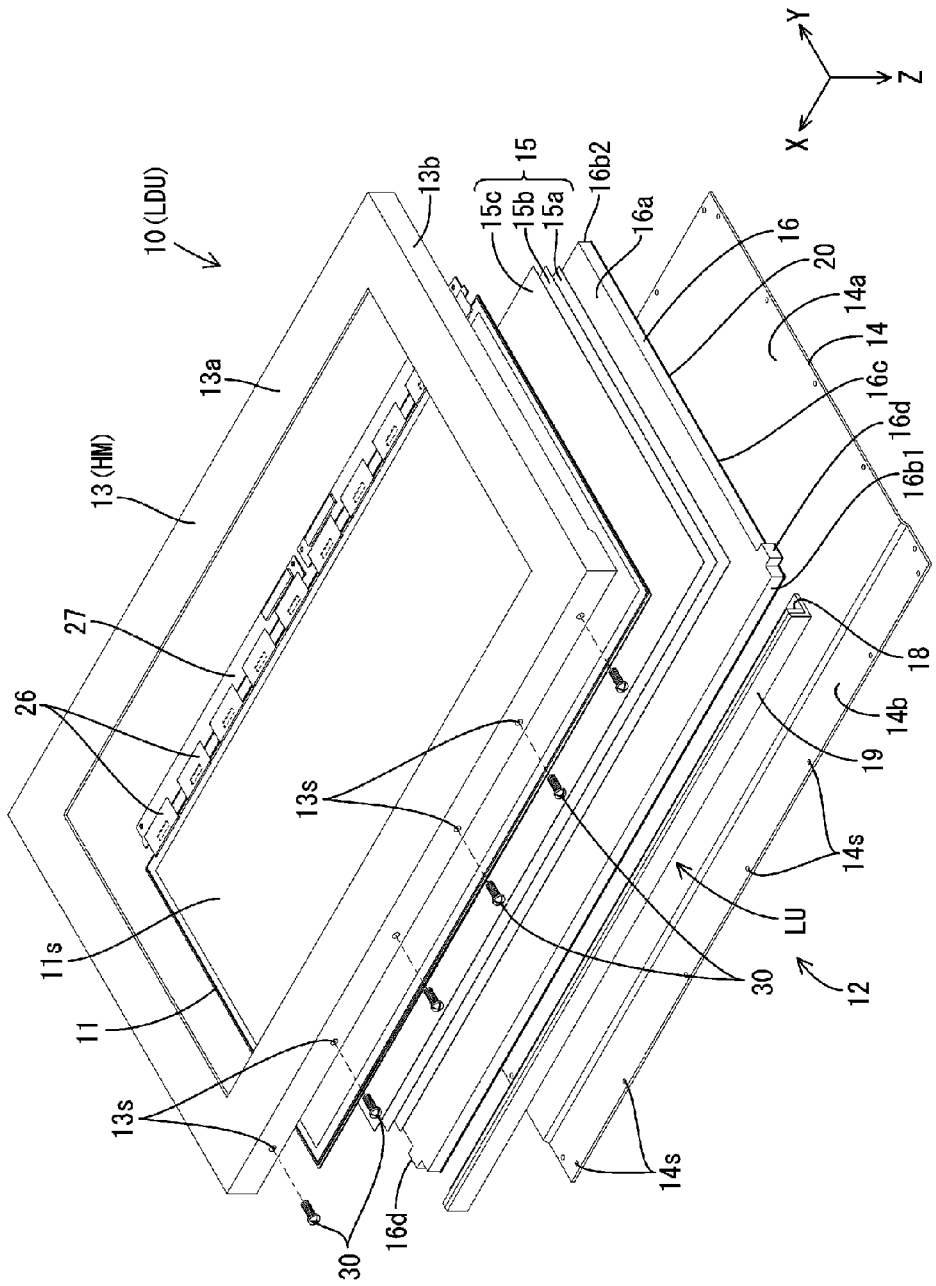
FIG. 3 is an exploded perspective view showing a schematic configuration of the liquid crystal display unit LDU that forms the liquid crystal display device 10.

As shown in FIG. 3, the main constituting components of the liquid crystal display unit LDU, which forms a portion of the liquid crystal display device 10, are housed in a space between the frame 13 that constitutes the front exterior of the liquid crystal display device 10, and the chassis 14 that constitutes the rear exterior. The main constituting components housed between the frame 13 and the chassis 14 include at least the liquid crystal panel 11, optical members 15, a light guide plate 16, and LED units LU. Of these, the liquid crystal panel 11, the optical members 15, and the light guide plate 16 are held by being sandwiched between the frame 13 on the front side and the chassis 14 on the rear side while being stacked one on top of the other. The backlight device 12 is constituted of the optical members 15, the light guide plate 16, the LED units LU, and the chassis 14, and is the configuration of the liquid crystal display unit LDU described above excluding the liquid crystal panel 11 and the frame 13. A pair of the LED units LU, which is a part of the backlight device 12, is disposed between the frame 13 and the chassis 14 so as to face an end face in the long side of the light guide plate 16. The LED unit LU is constituted of the LEDs (example of a light source) 17, which are the light source, an LED substrate 18 on which the LEDs 17 are mounted, and a heat dissipating member (example of a substrate holding member) 19 to which the LED substrate 18 is attached and held. The respective constituting components will be explained below.

As shown in FIG. 3, the liquid crystal panel 11 has a horizontally long quadrilateral (rectangular) shape when seen in a plan view, and a pair of glass substrates 11b and 11c (see FIG. 4) with excellent light transmission are attached to each other with a prescribed gap therebetween, and liquid crystal is sealed between the two substrates 11b and 11c. On one of the substrates (the array substrate) 11b, switching elements (TFTs, for example) connected to source wiring lines and gate wiring lines that are intersecting with each other, and pixel electrodes connected to the switching elements, an alignment film, and the like are provided. Color filters having colored portions such as R (red), G (green), and B (blue) arranged in prescribed arrays, an opposite electrode, an alignment film, and the like are provided on the other substrate (CF substrate) 11c. The liquid crystal panel 11 is stacked on the front side of the optical members 15 described below, and the rear surface thereof (outer surface of a polarizing plate on the rear side) is in close contact with the optical members 15 with almost no gap therebetween. With this configuration, dust and the like are prevented from entering the space between the liquid crystal panel 11 and the optical members 15. A display surface 11s of the liquid crystal panel 11 is constituted of a display region that is in the center of the surface and that can display images, and a non-display region that is in the outer edges of the surface and that is formed in a frame shape surrounding the display region. The liquid crystal panel 11 is connected to the control board CTB via a driver part for the liquid crystal and a flexible substrate 26, and based on signals inputted from the control board CTB, images are displayed in the display region on the display surface 11c. Polarizing plates 11a and 11d are respectively disposed on the outer sides of both substrates 11b and 11c.

As shown in FIG. 3, the optical members 15 have a horizontally-long quadrilateral shape in a plan view in a manner similar to the liquid crystal panel 11, and the size thereof (short side dimension and long side dimension) is similar to that of the liquid crystal panel 11. The optical members 15 are stacked on the front side (side from which light is emitted) of the light guide plate 16 described below, and are sandwiched between the liquid crystal panel 11 described above and the light guide plate 16. All of the optical members 15 are sheet-shaped and the three optical members are arranged so as to be stacked one on top of the other. Specifically, the optical members 15 are formed of a diffusion sheet 15a, a lens sheet (prism sheet) 15b, and a reflective polarizing sheet 15c, in that order starting from the rear side (the side with the light guide plate 16). Furthermore, the size of the respective three sheets 15a, 15b, and 15c is approximately the same in a plan view. The optical members 15 may be formed of a diffusion sheet, a lens sheet, and a diffusion sheet stacked in that order from the rear side (light guide plate 16 side), or may be formed of two sheet members.

Figure 4:
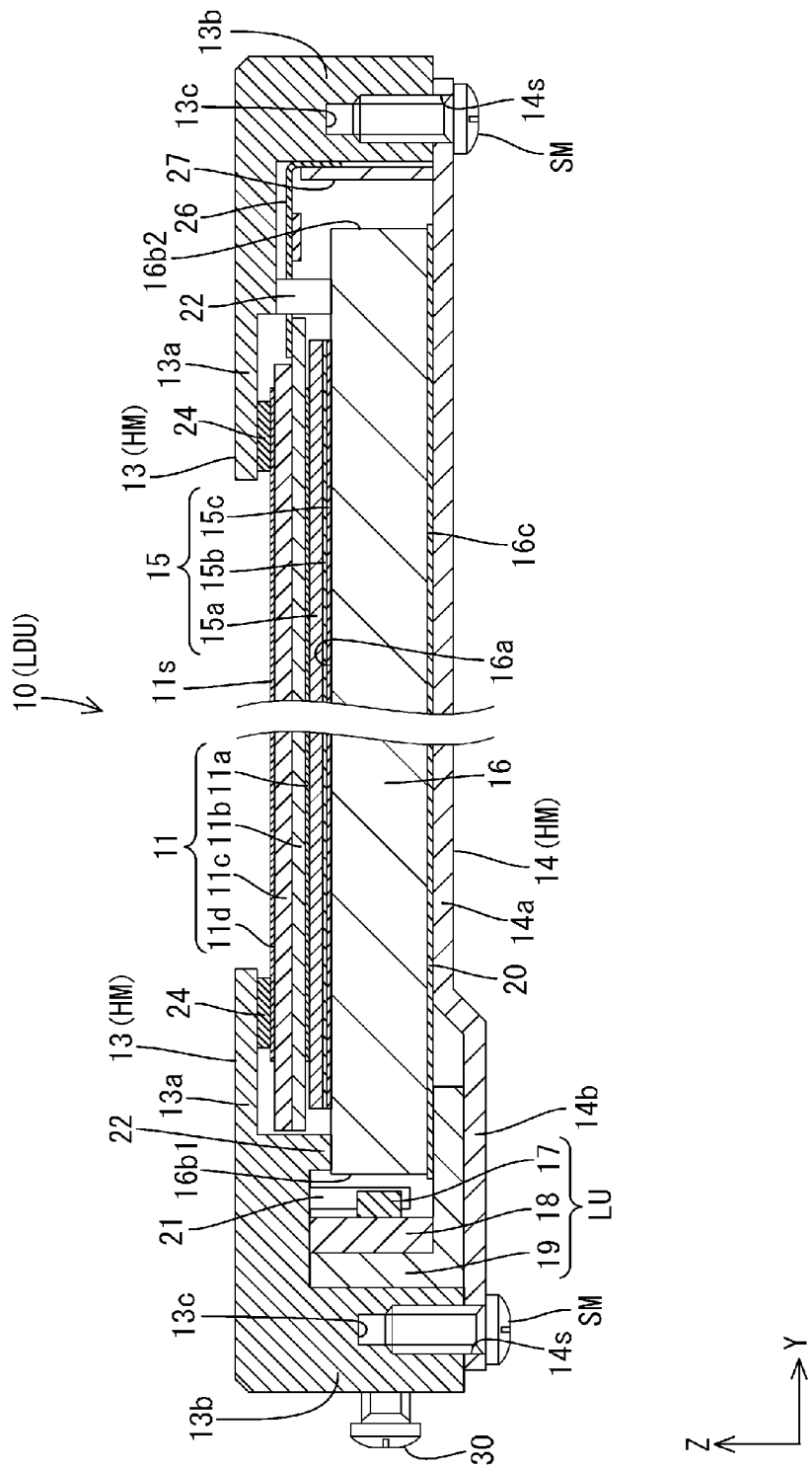
FIG. 4 is a cross-sectional view of a configuration of a liquid crystal display device 10 along the short side direction.

The light guide plate 16 is made of a synthetic resin (an acrylic resin such as PMMA or a polycarbonate, for example) with a sufficiently higher refractive index than air and is almost completely transparent (excellent light transmission). As shown in FIG. 3, the light guide plate 16 has a horizontally-long quadrilateral shape in a plan view, in a manner similar to the liquid crystal panel 11 and the optical members 15, and has a plate shape that is thicker than the optical members 15. The long side direction on the main surface of the light guide plate 16 corresponds to the X axis direction, the short side corresponds to the Y axis direction, and the plate thickness direction intersecting the main surface corresponds to the Z axis direction. The light guide plate 16 is placed on the rear side of the optical members 15, and is sandwiched between the optical members 15 and the chassis 14. As shown in FIG. 4, at least the short side dimension of the light guide plate 16 is greater than the respective short side dimensions of the liquid crystal panel 11 and the optical members 15, and the light guide plate 16 is disposed such that respective edges in the short side direction (respective edges along the long side direction) protrude outward beyond respective edges of the liquid crystal panel 11 and the optical members 15 (so as not to overlap in a plan view). This light guide plate 16 is disposed such that one side face (light-receiving face 16b1) in the long side direction faces the LED unit LU, and the side face receives light from the respective LEDs 17. The light guide plate 16 has the function of guiding therethrough light from the LEDs 17 that entered from the edge in the short side direction and emitting the light toward the optical members 15 (front side) while internally propagating this light.

Figure 8:
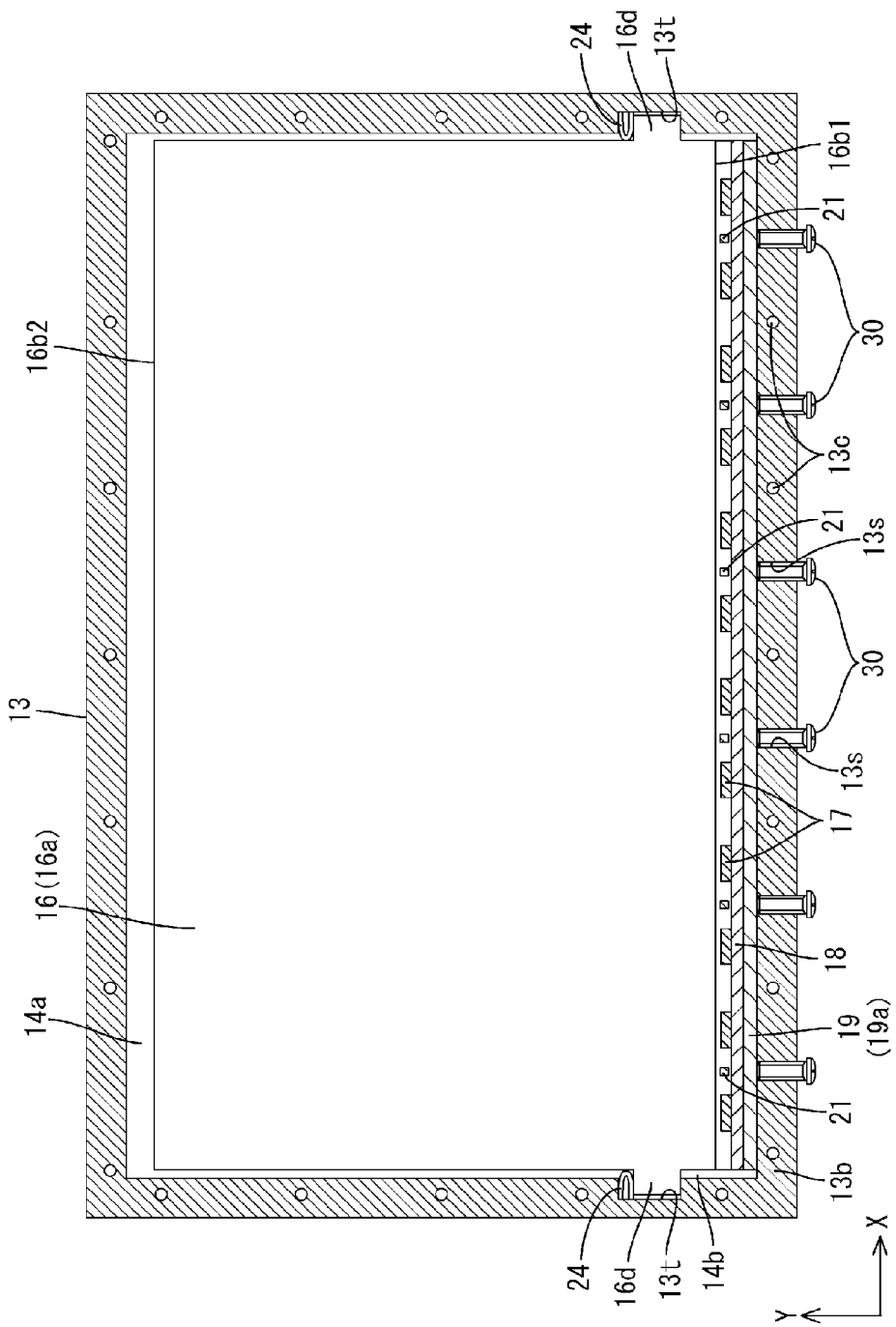
FIG. 8 is a horizontal cross-sectional view from a front side of the frame 13 that houses a light guide plate 16.

Of the main surfaces of the light guide plate 16, the surface facing the front side (facing the optical members 15) is a light exiting surface 16a where internal light exits towards the optical members 15 and the liquid crystal panel 11. Of the two peripheral edge faces adjacent to the main surface of the light guide plate 16, the edge face of the light guide plate 16 in the long side direction along the X axis is a light-receiving face 16b1 that directly faces the respective LEDs 17 (LED substrates 18) with a prescribed gap therebetween and that receives light emitted from the LEDs 17. On the other hand, in this configuration, the LED unit LU is not disposed on an opposite side face 16d2 that is an edge face on a side of the light guide plate 16 opposite to the light-receiving face 16b1. As shown in FIG. 4, a reflective sheet 20 is provided on the rear side of the light guide plate 16, or namely, on an opposite surface 16c opposite to the light-emitting surface 16a (the surface facing the chassis 14). This reflective sheet 20 covers almost the entire opposite surface 16c. As shown in FIGS. 3 and 8, a pair of position fixing protrusions 16d is respectively provided on both side faces of the light guide plate 16 in the short sides thereof in two locations near the light-receiving face 16b1, the position fixing protrusions 16d protruding outwards and having a block shape. The position fixing protrusions 16d have a size that can fit into position fixing recesses 13t (mentioned later), which are respectively disposed in the same position as the position fixing protrusions 16d and which each have a rectangular shape in a plan view with the same size as the position fixing protrusions 16d.

The reflective sheet 20 is disposed so as to be sandwiched between the chassis 14 and the light guide plate 16 and can reflect light that exits to the rear side back towards the front side. The reflective sheet 20 is made of a synthetic resin, and the surface thereof has a highly reflective white color. The short side dimension of the reflective sheet 20 is substantially equal to the short side dimension of the light guide plate 16, and two edges of the reflective sheet 20 are positioned so as to match the light-receiving face 16b1 of the light guide plate 16.

Next, the LEDs 17, the LED substrate 18, and a heat dissipating member 19 that constitute the LED unit LU will be explained in that order. The LEDs 17 that constitute the LED unit LU have a configuration in which an LED chip (not shown) is sealed with a resin on a substrate part that is affixed to the LED substrate 18. The LED chip mounted on the substrate part has one type of primary light-emitting wavelength, and specifically, only emits blue light. On the other hand, the resin that seals the LED chip has a fluorescent material dispersed therein, the fluorescent material emitting light of a prescribed color by being excited by the blue light emitted from the LED chip. This combination of the LED chip and the fluorescent material causes white light to be emitted overall. As the fluorescent material, a yellow fluorescent material that emits yellow light, a green fluorescent material that emits green light, and a red fluorescent material that emits red light, for example, can be appropriately combined, or one of them can be used on its own. Each of the LEDs 17 is of a so-called top-emitting type in which the side of the LED opposite to the side mounted onto the LED substrate 18 (side facing the light-receiving face 16b1 of the light guide plate 16) is the primary light-emitting surface.

As shown in FIGS. 3 and 8, the LED substrate 18 that constitutes the LED unit LU is formed in a narrow plate shape that extends along the long side direction (X axis direction) of the light guide plate 16 and is housed between the frame 13 and the chassis 14 such that the main surface thereof is parallel to the X axis direction and the Z axis direction, or in other words, in parallel with the light-receiving face 16b1 of the light guide plate 16. On the inner surfaces of the respective LED substrates 18, or in other words, on the surfaces facing the light guide plate 16 (hereinafter, mounting surfaces), a plurality of the LEDs 17 having the above-mentioned configuration are mounted thereon. Each of the LEDs 17 is disposed on the mounting surface of the LED substrate 18 so as to be aligned along the lengthwise direction of the LED substrate (X axis direction) in a row with a prescribed gap in-between, and the optical axis substantially matches the Y axis direction. The base member of the LED substrate 18 is made of a metal such as aluminum, for example, and a wiring pattern (not shown) made of metal film is formed on the surface through an insulating layer. The base material of the LED substrate 18 can alternatively be formed of an insulating material such as a ceramic.

Figure 6:
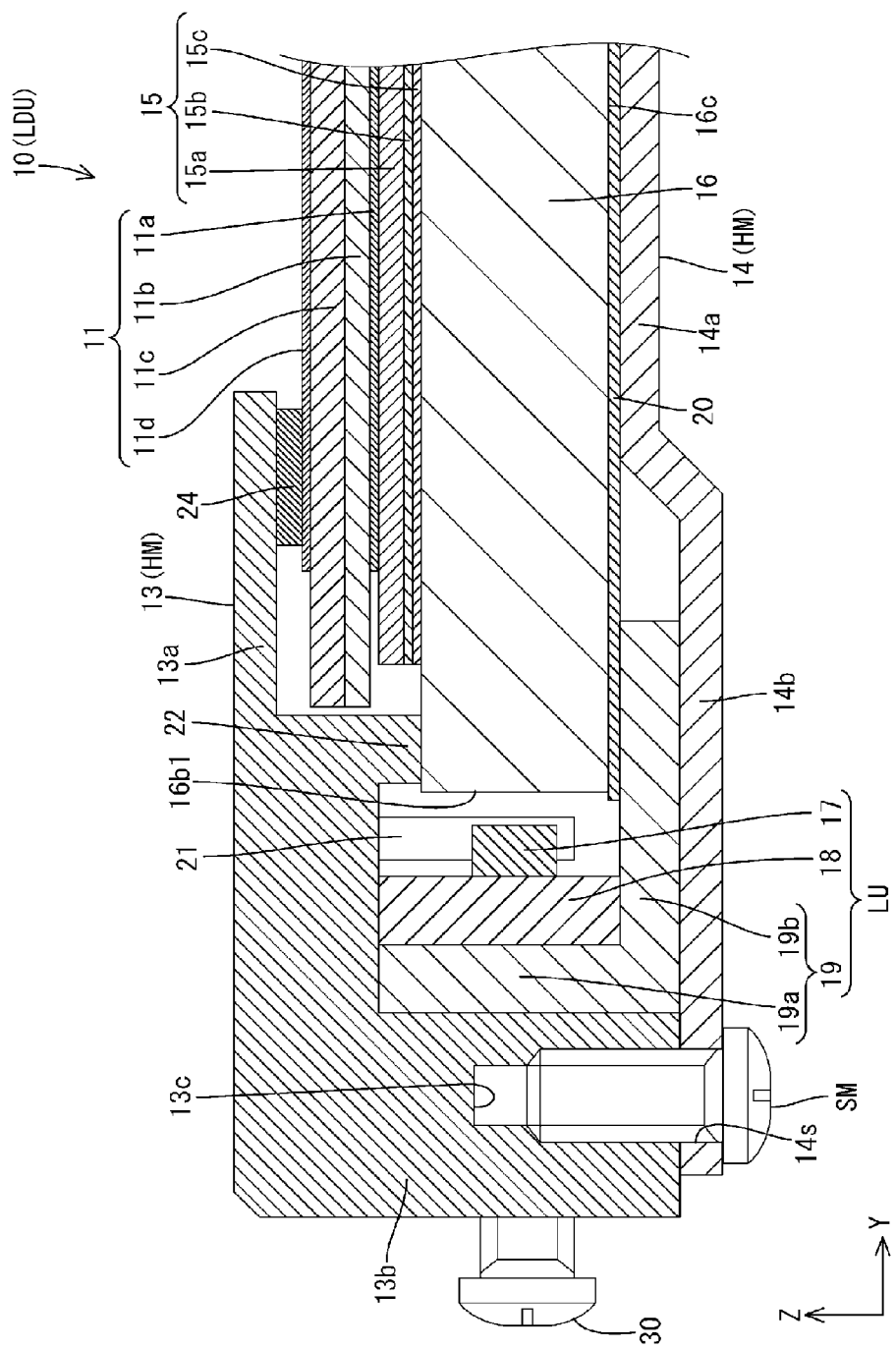
FIG. 6 is a cross-sectional view of main components of the liquid crystal display device 10 in which the vicinity of an adjusting screw 30 is magnified.

As shown in FIGS. 3, 4, and 6, the heat dissipating member 19 of the LED unit LU is made of a metal such as aluminum, for example, that has excellent heat conductivity, an attaching section (example of a plate-shaped section) 19a to which the LED substrate 18 is attached, and a heat dissipating section 19b (example of a bottom surface section) that makes surface-to-surface contact with the plate surface of the chassis 14, and these two portions form a bent shape having a substantially L-shaped cross section. The length dimension of the heat-dissipating member 19 is substantially the same as the length dimension of the LED substrate 18. The attaching section 19a of the heat-dissipating member 19 is in a plate shape that runs parallel to the surface of the LED substrate 18 and the light-receiving surface 16b1 of the light guide plate 16, and the long side direction corresponds to the X axis direction, the short side direction corresponds to the Z axis direction, and the thickness direction corresponds to the Y axis direction, respectively. The inner surface (one surface) of the LED attaching section 19a, namely the surface facing the light guide plate 16, has the LED substrate 18 attached thereto. While the long side dimension of the attaching section 19a is substantially the same as the long side dimension of the LED substrate 18, the short side dimension of the attaching section 19a is slightly larger than the short side dimension of the LED substrate 18. In other words, the rear side edge of the attaching section 19a (side facing the chassis 14) protrudes further outwards in the Z axis direction compared to the rear side edge of the LED substrate 18. The outer surface (other surface) of the attaching section 19a faces the side wall (example of a side wall) 13b of the adjusting screw and the frame 13 mentioned later, and the attaching section 19a is interposed between the side wall 13b of the frame 13 and the light guide plate 16. The attaching section 19a is configured to rise from the outer edge of the heat dissipating section 19b, or in other words towards the front side from an edge of the side wall 13b in the Z axis direction (liquid crystal panel 11, optical members 15, and light guide plate 16), or namely, towards the frame 13.

As shown in FIGS. 3 and 6, the heat dissipating section 19b is formed in a plate shape that is parallel to the surface of the chassis 14, and the long side direction of the heat dissipating section corresponds to the X axis direction, the short side direction corresponds to the Y axis direction, and the thickness direction corresponds to the Z axis direction, respectively. The heat dissipating section 19b protrudes from the rear edge of the attaching section 19a, or in other words, from the edge closer to the chassis 14 towards the outside, or namely, in the direction opposite to the light guide plate 16. The long side dimension of the heat dissipating section 19b is substantially the same as that of the attaching section 19a. The rear surface of the heat dissipating section 19b, or in other words, the entire surface facing the chassis 14, is in surface-to-surface contact with the chassis 14 (details mentioned later with second bottom plate 14b). As a result, heat generated by the LEDs 17 is transferred to the chassis 14 through the LED substrate 18, attaching section 19a, and the heat dissipating section 19b, and the heat is efficiently dissipated outside the liquid crystal display device 10. The front surface of the heat dissipating section 19b in the inner side thereof is in contact with the rear surface of the reflective sheet 20, and the heat dissipating section 19b is sandwiched (interposed) between the reflective sheet 20 (light guide plate 16) and the chassis 14 (second bottom plate 14b). In this manner, a portion of the heat dissipating section 19b is sandwiched between the reflective sheet 20 and the chassis 14 and the heat dissipating member 19 is held on the chassis 14. Neither the heat dissipating section 19b and the reflective sheet 20, nor the heat dissipating section 19b and the chassis 14 are fixed to each other, and thus the heat dissipating member 19 that is held on the chassis 14 can slide in a direction perpendicular to the light-receiving face 16b1 of the light guide plate 16.

Next, the configurations of the frame 13 and the chassis 14 that constitute the exterior member and the holding member HM will be explained. The frame 13 and the chassis 14 are both made of a metal such as aluminum, for example, and have higher mechanical strength (rigidity) and heat conductivity compared to a case in which the frame 13 and the chassis 14 are made of a synthetic resin. As shown in FIG. 3, the frame 13 and the chassis 14 hold the liquid crystal panel 11, the optical members 15, and the light guide plate 16, which are stacked on top of the other, by sandwiching these stacked components from the front side and the rear side, while housing the pair of LED units LU on the respective edges (respective long side edges) in the short side direction.

As shown in FIG. 3, the frame 13 is formed in a horizontally-long frame shape as a whole so as to surround the display region of the display surface 11s of the liquid crystal panel 11. The frame 13 is constituted of a panel pressing portion 13a that is disposed in parallel with the display surface 11s of the liquid crystal panel 11 and that presses the liquid crystal panel 11 from the front side, and side walls 13b that protrude from the outer edges of the panel pressing portion 13a toward the rear side, and has a substantially L-shaped cross portion. The panel pressing portion 13a is formed in a horizontally-long frame shape similar to the outer edge portion (non-display region, frame portion) of the liquid crystal panel 11, and can press almost the entire outer edge portion of the liquid crystal panel 11 from the front side. The panel pressing portion 13a is made wide enough to cover the outer edges of the optical members 15 and the light guide plate 16 that are located outside of the respective long sides of the liquid crystal panel 11 in the light radiating direction, and the respective LED units LU from the front side, in addition to the outer edges of the liquid crystal panel 11. The front outer surface of the panel pressing portion 13a (surface opposite to the side facing the liquid crystal panel 11) is exposed to the outside on the front side of the liquid crystal display device 10 as in the display surface 11s of the liquid crystal panel 11, and constitutes the front side of the liquid crystal display device 10 together with the display surface 11s of the liquid crystal panel 11. On the other hand, the side walls 13b take the form of a substantially angular enclosure that protrudes from the outer side portion (specifically, the outer edge) of the panel pressing portion 13a toward the rear side.

Figure 5:
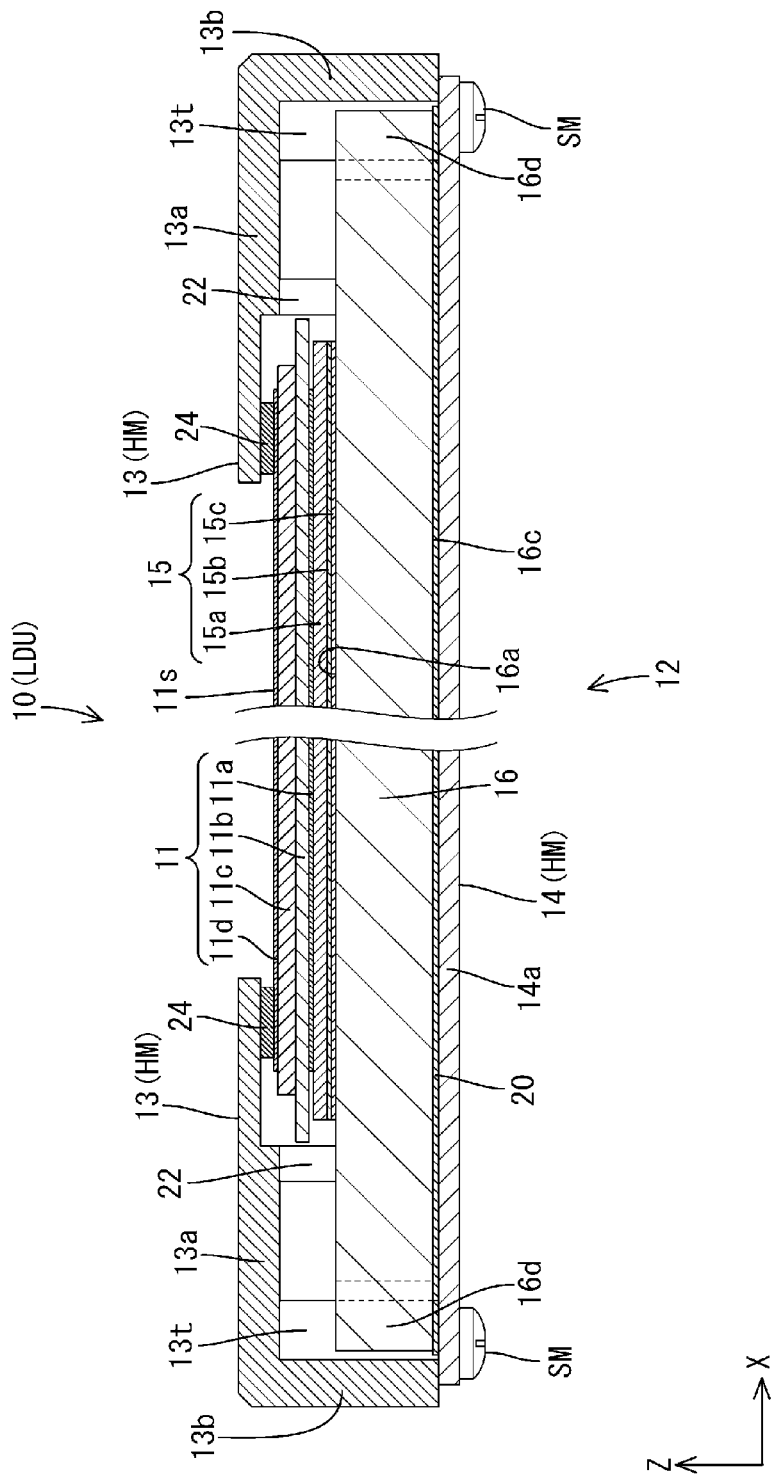
FIG. 5 is a cross-sectional view of a configuration of a liquid crystal display device 10 along the long side direction.

As shown in FIGS. 4 and 5, a cushioning material 24 is disposed between the inner edge of the panel pressing portion 13a and the liquid crystal panel 11. The liquid crystal panel 11 can be pressed from the front side through this cushioning material 24. The cushioning materials 24 are provided separately on respective sides of the frames constituting the frame 13 so as to extend along the respective sides. If the respective separated frames are assembled, then the cushioning material 24 will have a frame shape provided along the entire inner edge of the panel pressing portion 13a.

An abutting rib 22 is integrally formed with the panel pressing portion 13a on a portion thereof that is located slightly outwards to an edge of the liquid crystal panel 11 so as to support the light guide plate 16 from the front side (front surface 11s side). The abutting ribs 22 respectively protrude from a portion of the inner surface of the panel pressing portion 13a toward the rear (light guide plate 16 side) along the Z axis direction (protruding direction of the restricting portion 21), and the abutting ribs 22 have a substantially narrow block shape that extends along the respective sides of the panel pressing portion 13a. The abutting ribs 22 are respectively provided on the sides of the panel pressing portion 13a such that each abutting rib 22 has the same length as each side of the panel pressing portion 13a. Thus, the abutting rib 22 can support the light guide plate 16 from the front side (display surface 11s side) while sandwiching the light guide plate 16 with the chassis 14, and the abutting rib 22 thereby has a light guide plate supporting function. The light guide plate 16 is pressed from the front side by the abutting ribs 22 in which the edge portions thereof form a frame shape as a whole. In addition, the abutting rib 22 has a light shielding function that prevents light emitted from the LEDs 17 from entering the edge face of the optical members 15.

Figure 7:
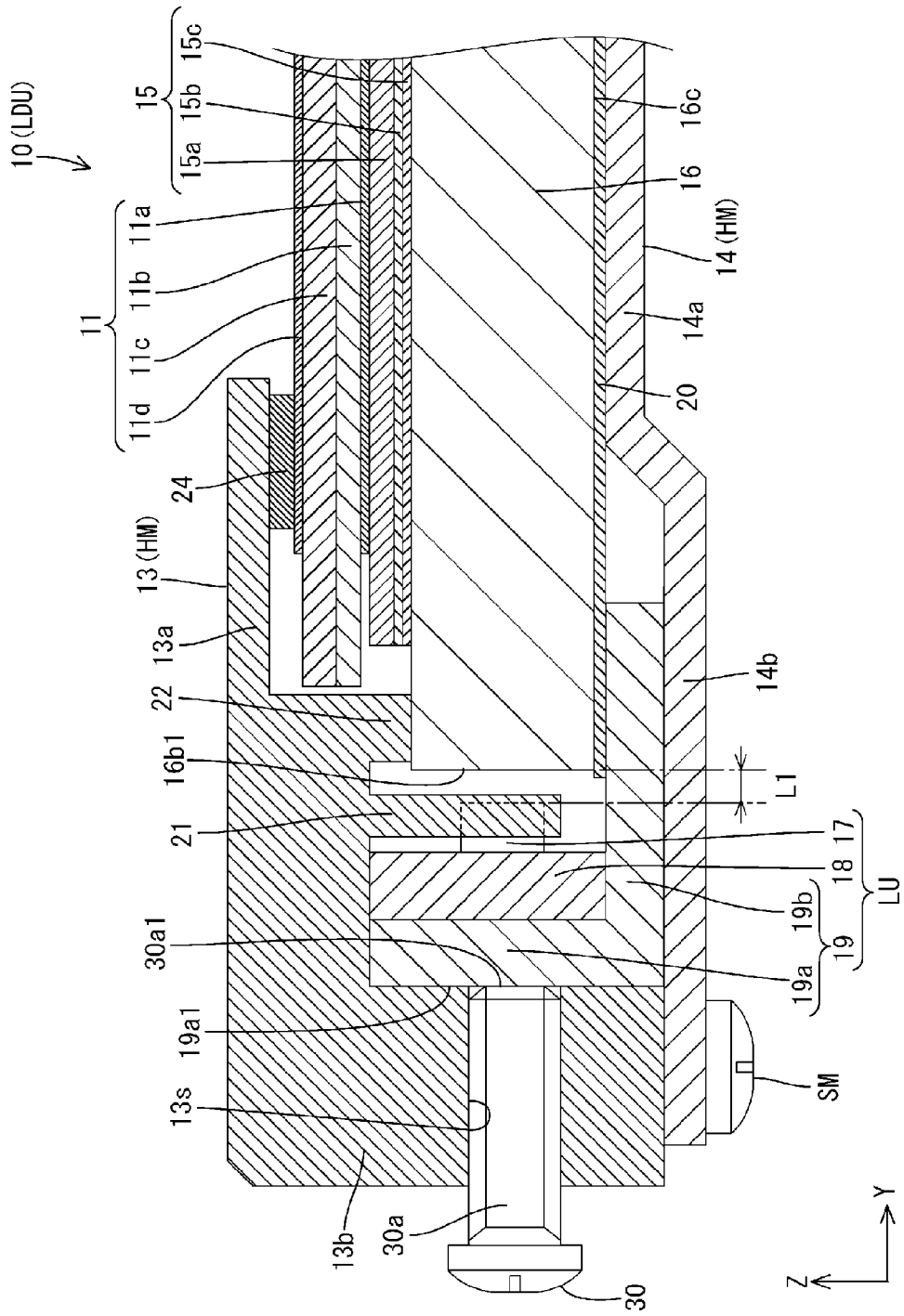
FIG. 7 is a cross-sectional view of main components in another cross-section of the liquid crystal display device 10 in which the vicinity of the adjusting screw 30 is magnified.

As shown in FIGS. 7 and 8, a plurality of restricting portions 21 protruding towards the chassis 14 side are provided on a portion of the panel pressing portion 13a located slightly outward (side opposite to the liquid crystal panel 11 side) of the abutting rib 22 such that the portion is exposed between the light-receiving face 16b1 of the light guide plate 16 and the LED substrate 18. The restricting portion 21 has a flat plate shape, and the plate surface thereof is in parallel with the light-receiving face 16b1 of the light guide plate 16 and the plate surface of the LED substrate 18. In other words, the long side direction of the restricting portion 21 matches the long side direction of the light-receiving face 16b1 of the light guide plate 16 (long side direction of the LED substrate 18), and the short side direction of the restricting portion 21 matches the short side direction of the light-receiving face 16b1 of the light guide plate 16 (short side direction of the LED substrate 18). A plurality of restricting portions 21 are respectively provided between adjacent LEDs 17 and are disposed in a location corresponding to adjusting screws 30 mentioned later. Therefore, the location in the X axis direction in which the restricting portion 21 is provided matches the location where the adjusting screw 30 mentioned later is disposed (see FIG. 8). The bottom edge of the restricting portion 21 (tip towards the chassis 14) protrudes further towards the chassis 14 than the bottom side face of the LED 17 (see FIG. 7).

The side wall 13b is large enough to surround the entire periphery of the liquid crystal panel 11, the optical member 15, the light guide plate 16, and the respective LED units LU housed inside, and also comes into contact with the peripheral surface of the chassis 14. The outer surfaces of the side walls 13b along the circumferential direction of the liquid crystal display device 10 are exposed to the outside in the circumferential direction of the liquid crystal display device 10, and constitute the top face, the bottom face, and the side faces of the liquid crystal display device 10. The side wall 13b has a horizontally long substantially block shape that protrudes from the panel pressing portion 13a towards the rear along the Z axis direction, and extends along each side (X axis direction or Y axis direction) of the panel pressing portion 13a. The tip of the side wall 13b is in contact with the outer edge portion of the second bottom plate (example of a bottom plate) 14b of the chassis 14 mentioned later. As shown in FIG. 4, the side wall 13b has an opening towards the rear and a groove 13c where the screw member SM can be fastened (also see FIG. 6).

As shown in FIGS. 5 and 8, a position fixing recess 13t having an opening towards the position fixing protrusion 16d is provided in the inner side of the side wall 13b of the frame 13, in a location corresponding to the position fixing protrusion 16d provided on the light guide plate 16. The position fixing recess 13t has a recess that corresponds to the side faces of the position fixing protrusion 16d. The position fixing recess 13t has a size in which the position fixing recess 13t and the position fixing protrusion 16d can be joined with a gap therebetween, and the light guide plate 16 is housed in the frame 14 while the position fixing protrusion 16d and the position fixing recess 13t are joined. In addition, a pair of spring plates 24 and 24 that are elastically deformable are provided in a gap between the position fixing protrusion 16d and the position fixing recess 13t in a direction perpendicular to the light-receiving face 16b1 (Y axis direction). In this manner, the position fixing protrusion 16d and the position fixing recess 13t are joined, and because the spring plates 24 are disposed in the gap between the recess and the protrusion, the position of the light guide plate 16 is fixed in the plate surface direction (X-Y plane direction).

As shown in FIG. 4, on a side face (other side face) 16b2 in which the LED unit LU is not disposed among the long side faces of the light guide plate 16, a space that can house a printed board 27 is provided between the side face 16b2 and the side wall 13b facing the side face 16b2. On a printed board 27, a plurality of the flexible substrates 26 are arranged at intervals along the long side direction thereof, and the other ends of the flexible substrates 26 are respectively connected to the printed board 27. The printed board 27 also has a connector to which one end of the FPC is inserted and connected (neither the connector nor FPC is shown in the figures), and the other end of the FPC is led out to the outside on the rear side of the chassis 14 through an FPC insertion hole (not shown) formed in the chassis 14, and is connected to the control board CTB.

As shown in FIG. 3, the chassis 14 is formed in a substantially shallow plate shape that is horizontally long as a whole so as to almost entirely cover the light guide plate 16, the LED units LU, and the like from the rear side. The rear outer surface of the chassis 14 (surface opposite to the side facing the light guide plate 16) is exposed to the outside on the rear side of the liquid crystal display device 10, and constitutes the rear surface of the liquid crystal display device 10. The chassis 14 has a first bottom plate portion 14a having a horizontally long rectangular shape similar to the light guide plate 16, and has a second bottom plate portion 14b that protrudes from a long side edge of the first bottom plate portion 14a to the second bottom plate portion 14b in steps.

As shown in FIGS. 3 and 6, the first bottom plate portion 14a has a flat plate shape that can receive a large portion (portion excluding one tip portion in the short side direction) of the light guide plate 16 in the short side direction, and thus, in a sense, the first bottom plate portion 14a forms a receiving portion for the light guide plate 16. As shown in FIG. 5, a pair of edge portions of the first bottom plate portion 14a in the long side direction respectively extends farther outwards than a pair of edge portions of the light guide plate 16 in the long side direction, and the screw member SM that fixes the frame 13 and the chassis 14 is mounted to the pair of edge portions.

As shown in FIGS. 3 and 4, the LED unit LU can be placed on the second bottom plate portion 14b because the second bottom plate portion is located in a level closer to the rear than the first bottom plate portion 14a. The second bottom plate portion 14b is in parallel with the first bottom plate portion 14a, and the second bottom plate portion 14b is disposed such that the inner surface thereof is in surface-to-surface contact with the heat dissipating portion 19b of the heat dissipating member 19 forming the LED unit LU. The inner surface of the outer edge portion of the second bottom plate portion 14b is in contact with the tip of the side wall 13b of the frame 13 and the screw member SM is mounted to the outer edge portion from outside.

Next, descriptions of the main components of the present embodiment including the configuration of the penetrating hole 13s provided in the side wall 13b and the adjusting screw (example of pillar-shaped member) 30 that is penetrated by the penetrating hole 13s will be provided. As shown in FIGS. 7 and 8, the side wall 13b has a plurality of penetrating holes 13s that penetrate the side plate 13b in the thickness direction (Y axis direction). The plurality of penetrating holes 13s are only provided on the side wall 13b of the frame that faces the LED unit LU. Specifically, the plurality of penetrating holes 13s are provided along the long side direction (X axis direction) of the LED substrate 18 with a gap between adjacent penetrating holes 13s, and are provided in locations corresponding to the gap between adjacent LEDs 17, or in other words in locations in the X axis direction corresponding to gaps between LEDs 17 that are adjacent. The respective penetrating holes 13s are grooved (not shown) in the side face. In the present embodiment, on one side wall 13b, six penetrating holes 13s are provided along a long side direction (X axis direction) of the LED substrate 18 (see FIG. 8).

Figure 9:
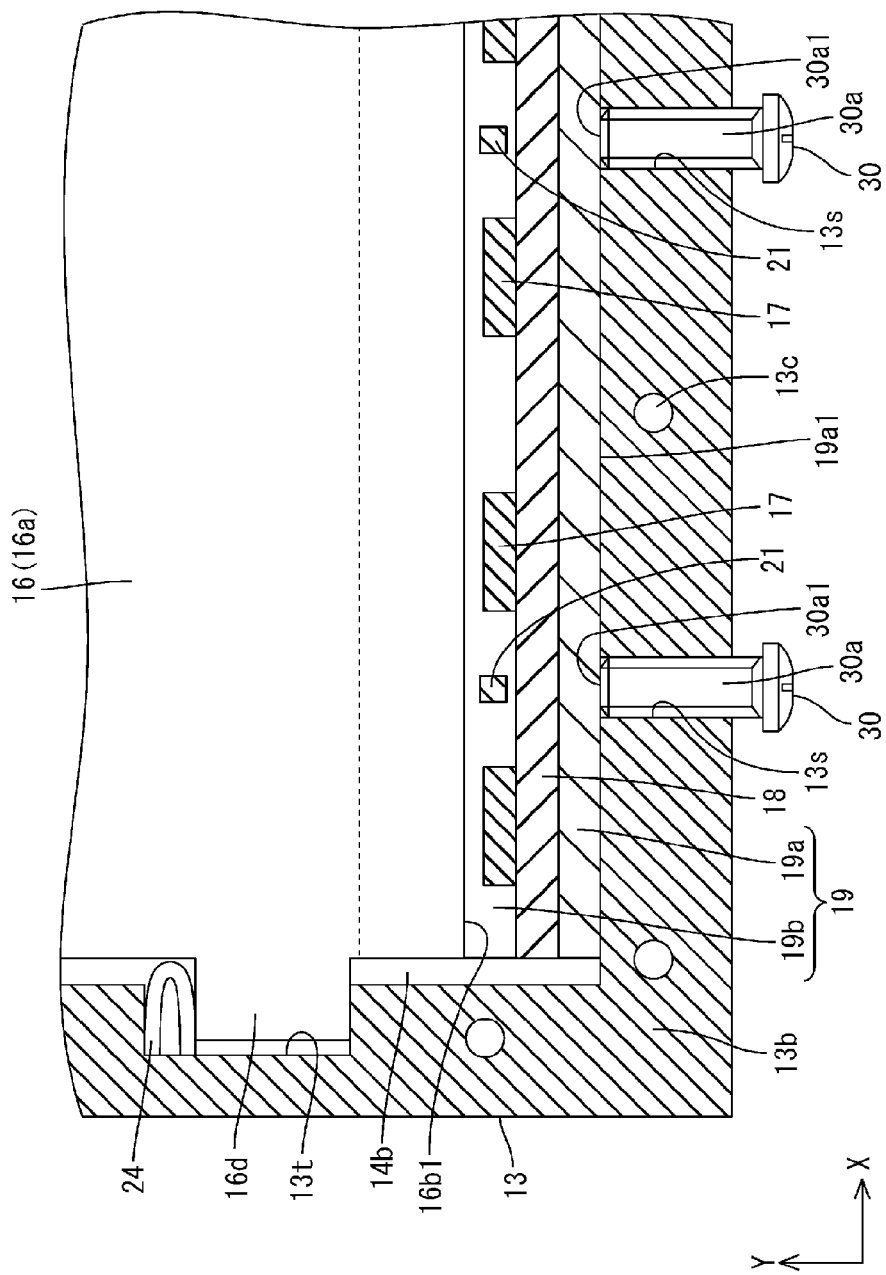
FIG. 9 is a horizontal cross-sectional view of FIG. 8 magnifying one corner of FIG. 8.
Figure 10:
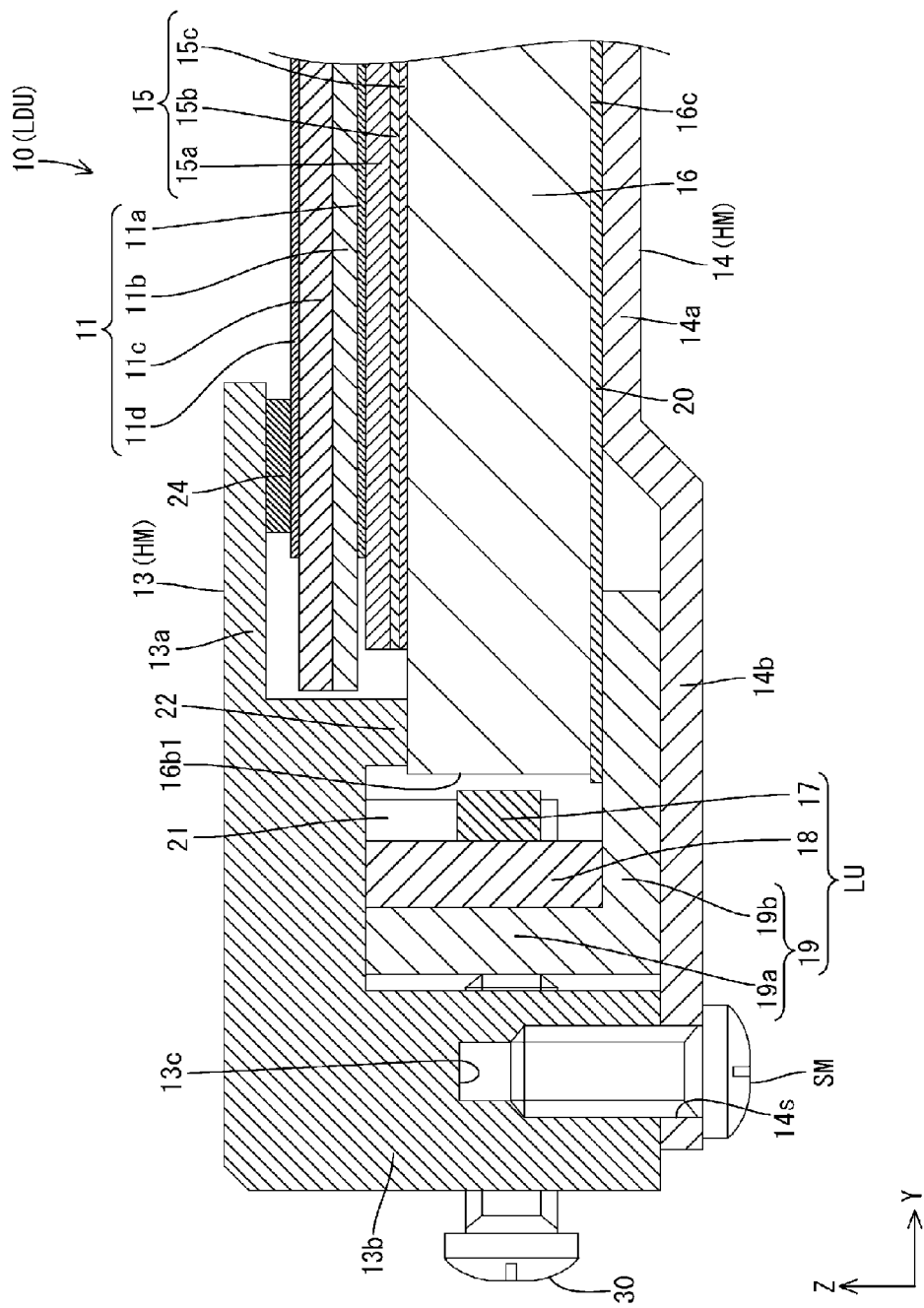
FIG. 10 is a cross-sectional view of main components corresponding to FIG. 6, and is a cross-sectional view of main components after an LED 17 is moved closer to the light-receiving face by the adjusting screw 30.

As shown in FIGS. 7 and 8, each penetrating hole 13s provided on one of the side walls 13b has the adjusting screw 30 inserted inside such that the adjusting screw 30 is screwed into the groove of the penetrating hole 13s. The adjusting screw 30 is inserted from the outer side of the side wall 13b (side opposite to the LED unit LU side). The adjusting screw 30 has a screw head and a pillar-shaped screw body 30a, and the screw head is located in the outer side of the side wall 13b (outer side of the liquid crystal display device 10). The screw body 30a penetrates each of the penetrating holes 13s. Then, as shown in FIG. 9, each adjusting screw 30 is inserted into each penetrating hole 13s until the tip 30a1 of the screw body 30a (example of an end of the pillar-shaped member, tip opposite the screw head) comes into contact with the outer side plate surface (other plate surface) of the attaching portion 19a of the heat dissipating member 19. The other edge of the screw body 30a (an example of the other edge of the pillar-shaped member, tip of the screw head side) of each of the adjusting screws 30 is located further outwards than the side wall 13b. As a result, the head of each of the adjusting screws 30 is slightly separated from the side wall 13b, and the tip of the screw body 30a (other end of adjusting screw 30) can be moved towards the light-receiving face 16b1 of the light guide plate 16 by twisting the screw head of each adjusting screw 30 (other end of adjusting screw 30) in the direction in which the adjusting screw is fastened to the groove of the penetrating hole 13s. The reference character L1 in FIG. 7 shows the distance between the LED 17 and the light-receiving face 16b1 of the light guide plate 16.

As mentioned above, the heat dissipating member 19 can slide in the direction (Y axis direction) perpendicular to the light-receiving face 16b1 of the heat dissipating member 19, and the tip 30a1 of the screw body 30a of each of the adjusting screws 30 is in contact with the attaching portion 19a of the heat dissipating member 19, and thus if the screw head of the adjusting screw 30 is twisted in, then the heat dissipating member 19 is pushed towards the light-receiving face 16b1 by the adjusting screw 30, and the LED 17 becomes closer to the light-receiving face 16b1 of the light guide plate 16. Furthermore, if the heat dissipating member 19 is pushed further towards the 16b1 by twisting the screw head of the adjusting screw 30, then the LEDs 17 of the LED substrate 18 come into contact with the plate surface of the restricting portion 21 mounted on the LED substrate 18 on which the LEDs 17 are mounted of the LED substrate 18, and therefore the heat-dissipating member 19 is restricted from further approaching the light-receiving face 16b1. In this state (state in which the heat dissipating member 29 is restricted from further approaching the light-receiving face 16b1), the reference character L2 in FIG. 11 refers to the distance between the LED 17 and the light-receiving face 16b1 of the light guide plate 16. In this manner, the distance between each LED 17 and the light-receiving face 16b1 of the light guide plate can be changed by twisting the adjusting screw 30. The plurality of adjusting screws 30 are provided along the long side direction (X axis direction) of the LED substrate 18, and thus by screwing in the adjusting screws 30 that are in the vicinity of the LEDs 17 in which the distance from the light-receiving face 16b1 of the light guide plate needs to be shortened can be shortened compared to other LEDs 17. As a result, the distance between the light-receiving face 16b1 and the LED 17 corresponding to the dark portion can be made closer, and thus the dark portion can be made brighter.

Therefore, the distance between each of the LEDs 17 and the light-receiving face 16b1 of the light guide plate 16 can be adjusted to a position that is optimized in response to the luminance distribution in areas of the liquid crystal panel 11 that overlap the vicinity of the light-receiving face 16b1 of the light guide plate 16.

The restricting portion 21 is disposed so as to restrict the distance between the LEDs 17 and the light-receiving face 16b1 of the light guide plate 16 such that the light-emitting faces of the LEDs 17 do not come into contact with the light-receiving face 16b1 of the light guide plate 16. As a result, even if the adjusting screw 30 is screwed in such that the heat dissipating member 19 becomes closer to the light-receiving face 16b1, the heat dissipating member 19 is prevented from coming into contact with the light-receiving face 16b1. As a result, the LEDs 17 are prevented from being damaged or the like from coming into contact with the light-receiving face 16b1 of the light guide plate 16.

Next, the manufacturing process of the liquid crystal display device 10 will be explained. During the manufacturing process of the liquid crystal display device 10, the members of the liquid crystal display device 10 are assembled one after another starting from the surface side thereof (top side in FIG. 4). Specifically, the position of the light guide plate 16 is fixed within the frame 13 by joining the position fixing protrusion 16d of the light guide plate 16 with the position fixing recess 13t of the frame 13, and the LED unit LU and the chassis 14 are fixed by screwing the chassis 14 to the frame 13 using the screw member SM while holding the LED unit LU through sandwiching the tip of the heat dissipating member 19 that forms the LED unit LU between the second bottom plate portion 14b of the chassis 14 and the light guide plate 16. In other words, with this type of process, the respective adjusting screws 30 are attached in the final step of the manufacturing process of the liquid crystal display device 10 after the chassis 14 is fixed.

Here, the liquid crystal display device 10 related to the present embodiment is the liquid crystal display device 10 of a so called cabinet-less type without a cabinet, and thus, usually, a lighting test for the respective LEDs 17 is conducted for the liquid crystal display device 10, but in some occasions, the distance between the LEDs 17 and the light-receiving face 16b1 varied due to variations in the assembling and the parts. In addition, the distance between the LEDs 17 and the light-receiving face 16b1 of the liquid crystal display device 10 was not adjustable. On the other hand, in the present embodiment, each of the LEDs 17 can be moved closer to the light-receiving face 16b1 by screwing in the screw head of the respective adjusting screws 30 from the outside of the side wall 13b. Therefore, even after the liquid crystal display device 10 is manufactured, the distance between the respective LEDs 17 and the light-receiving face 16b1 can be adjusted without removing the chassis 14. Therefore, even after the liquid crystal display device 10 is manufactured, the lighting test of the respective LEDs 17 can be conducted, and according to the results of the lighting test, the distance between the respective LEDs 17 and the light-receiving face 16b1 can be adjusted without removing the chassis 14, and the luminance of the display surface 11s of the liquid crystal panel 11 can be optimized.

As mentioned above, the liquid crystal display device 10 of the present embodiment can move the end 30a1 of the adjusting screw towards the light-receiving face 16b1 by screwing in the other end of the adjusting screw 30, and the end 30a1 can be attached to the outer side surface of the attaching section 19a of the heat dissipating member 19 (surface opposite to the side holding the LED substrate 18). Furthermore, by moving the end 30a1 of the adjusting screw 30 towards the light-receiving face 16b1, the adjusting screw 30 pushes the heat dissipating member 19, thereby moving the heat dissipating member 19 towards the light-receiving face 16b1. As a result, the LEDs 17 can be moved closer to the light-receiving face 16b1. Therefore, after the liquid crystal display device 10 is manufactured, if the luminance of the display surface 11s of the liquid crystal panel 11 is perceived to be dark, then the luminance in the display surface 11s can be made brighter by shortening the distance between the LEDs 17 and the light-receiving face 16b1 through screwing in the adjusting screw 30. In this manner, the luminance can be adjusted even after the liquid crystal display device 10 having the heat dissipating member 19 that holds the LED substrate 18 is manufactured.

The liquid crystal display device 10 is provided with the restricting portion 21 that protrudes from a portion of the frame 13 exposed between the LED substrate 18 and the light-receiving face 16b1. Furthermore, this restricting portion 21 can restrict the LED substrate 18 from moving towards the light-receiving face 16b1 by coming into contact with one surface of the LED substrate. By having this type of configuration, when an end of the adjusting screw 30 is moved towards the light-receiving face 16b1 of the LED 18, then the LED substrate 18 will come into contact with the LED substrate 18 such that the LED substrate 18 will be suppressed from moving any closer to the light-receiving face 16b1.

The liquid crystal display device 10 related to the present embodiment may have the LED substrate 18 having a rectangular shape, and may have a plurality of LEDs 17 disposed in a straight line along the long side direction of the LED substrate 18. By having this type of configuration, the distance between each of the LEDs 17 and the light-receiving face 16b1 can be adjusted by respectively moving a plurality of adjusting screws 30. As a result, if the luminance of the display surface 11s of the liquid crystal panel 11 differs among portions of the display surface 11s corresponding to each of the LEDs 17, the luminance of the display surface 11s can be optimized by moving the LED 17 that corresponds to the portions of the display surface 11s that is dark towards the light-receiving face 16b1. Even if the LED substrate 18 is warped due to heat or the like, the luminance of the display surface 11s can be optimized by making the distance between the respective portions of the LED substrate 18 and the light-receiving face 16b1 equal through changing the amount the respective adjusting screws 30 are moved according to the degree in which the LED substrate is warped.

In the liquid crystal display device 10 of the present embodiment, the adjusting screw 30 is disposed in a location corresponding to the gap between adjacent LEDs 17 and 17. The portion of the display surface 11s of the liquid crystal panel 11 that corresponds with a gap between the adjacent LEDs 17 is susceptible to becoming dark. In the configuration of the present embodiment, by having the adjusting screw 30 in a location corresponding to the gap between the adjacent LEDs 17, the luminance of the dark portion can be efficiently brightened, and therefore the luminance of the display surface 11s can be made even.

The liquid crystal display device 10 related to the present embodiment has the adjusting screw 30 that is a member that penetrates the penetrating hole 13s, and the penetrating hole 13s is grooved such that the adjusting screw 30 can be screwed into the groove. By having this type of configuration, the adjusting screw 30 can be moved towards the light-receiving face 16b1 by screwing in the adjusting screw 30 along the groove of the penetrating hole 13s. As a result, by changing the amount the adjusting screw 30 is screwed in, the distance the adjusting screw 30 is moved can be more finely adjusted compared to a configuration having a fastener or the like. As a result, the luminance of the display panel 11s of the liquid crystal panel 11 can be adjusted with higher accuracy.

In the liquid crystal display device 10 of the present embodiment, the heat dissipating member 19 extends in a plate shape along the second bottom plate 14b from an edge of the attaching section 19a adjacent to the second bottom plate 14b, and the surface of the heat dissipating member 19 comes into contact with the second bottom plate 14b of the chassis 14. The heat dissipating member includes the bottom surface section 19b having a portion thereof sandwiched between the light guide plate 16 and the second bottom plate 14b of the chassis 14. By having a portion of the bottom surface section 19b of the heat dissipating member 19 sandwiched between the light guide plate 16 and the second bottom plate 14b of the chassis 14, the heat dissipating member 19 is held on the second bottom plate 14b. Furthermore, the heat dissipating member 19 can be slid in a direction perpendicular (Y axis direction) to the light-receiving face 16b1 while being sandwiched. In this manner, a specific configuration in which the heat dissipating member 19 can slide in a direction perpendicular to the light-receiving face 16b1 while being held on the second bottom plate 14b of the heat dissipating member 19 can be provided.

In the liquid crystal display device 10 of the present embodiment, the light guide plate 16 has the position fixing protrusion 16d that protrudes towards the side wall 13b. In addition, the position fixing recess 13t is provided in a portion of the side wall 13b facing the position fixing protrusion 16d and has an opening corresponding to the position fixing protrusion 16d such that the position fixing protrusion 16d and the position fixing recess 13t can be joined. Furthermore, a gap is provided between the position fixing protrusion 16d and the position fixing recess 13t, and a pair of spring plates 24 and 24 that are elastically deformable in a direction perpendicular to the light-receiving face 16b1 is disposed in the gap. By having this type of configuration, the position fixing protrusion 16d and the position fixing recess 13t can be engaged, and the light guide plate 16 can be fixed in the plate surface direction (X-Y plane surface direction) between the frame 13 and the chassis 14. As a result, the light guide plate 16 can be made less likely to shift in position, and the distance between the LEDs 17 and the light-receiving face 16b1 can be adjusted with a higher accuracy. Furthermore, if the light guide plate 16 vibrates, then the spring plate 24 absorbs the vibration suppressing the light guide plate 16 from moving. As a result, the light guide plate 16 can be made less likely to shift position.

Modification Example of Embodiment 1

Figure 13:
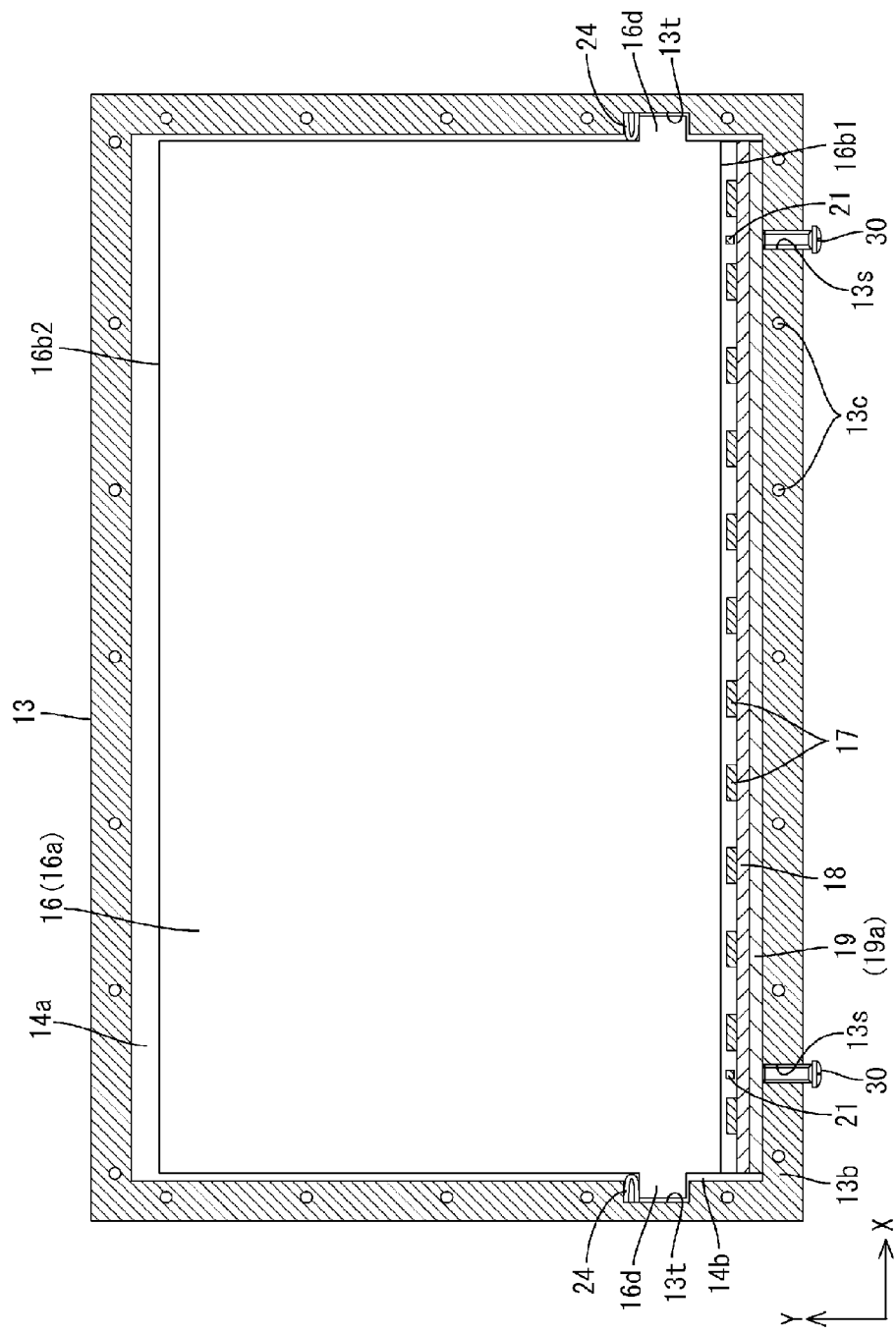
FIG. 13 is a horizontal cross-sectional view corresponding to FIG. 8, and is a horizontal cross-sectional view of a modification example of Embodiment 1.
Figure 14:
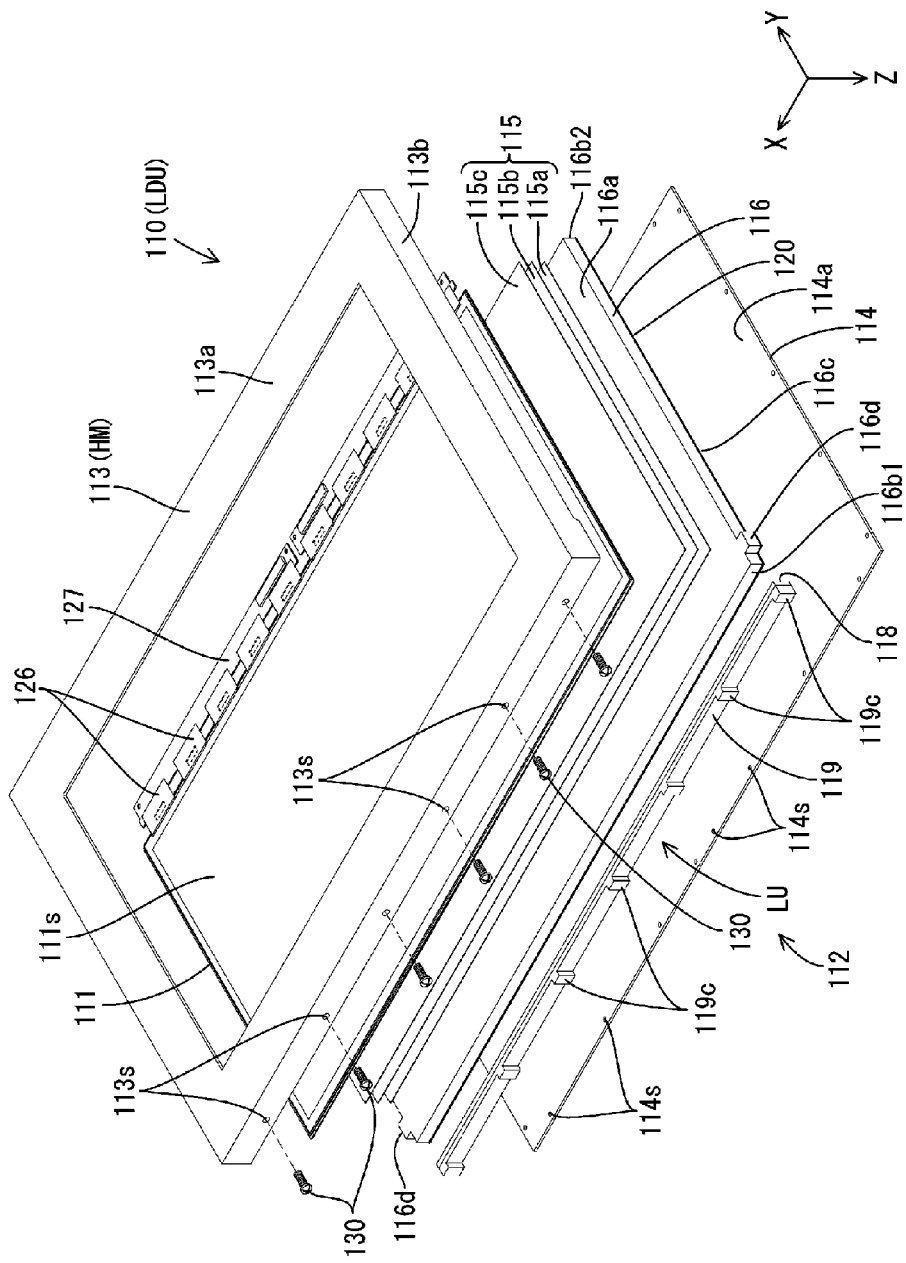
FIG. 14 is an exploded perspective view showing a schematic configuration of the liquid crystal display unit LDU forming the liquid crystal display device 110 of Embodiment 2.

Next, a modification example of Embodiment 1 will be described. The modification example shown in FIG. 13 has a different number of adjusting screws 30 compared to that of Embodiment 1. Other elements are similar to those of Embodiment 1, and therefore, descriptions of the configurations, the operation, and the effect will be omitted. As shown in FIG. 13, the modification example of Embodiment 1 has a pair of the adjusting screws 30 and 30 that are respectively disposed on the two edges of the LED substrate 18 in the long side direction (X axis direction). In the present embodiment, the LED substrate 18 has a rectangular shape, and as long as the adjusting screws 30 are respectively disposed in locations corresponding to at least both edges of the LED substrate 18 in the long side direction (X axis direction), then the entire LED substrate 18 can be moved closer to the light-receiving face 16b of the light guide plate 16 by respectively screwing in the pair of adjusting screws 30 and 30, and thus, the luminance of the liquid crystal display device 10 can be adjusted even after the liquid crystal display device 10 is manufactured. In this manner, a configuration related to the modification example can reduce the number of the adjusting screws 30 compared to Embodiment 1, and thus the manufacturing process can be simplified and the material cost related to the adjusting screws 30 can be reduced.

Embodiment 2

Embodiment 2 will be described with reference to the drawings. The shape of a heat dissipating member 119 in Embodiment 2 differs from that in Embodiment 1. Other elements are similar to those of Embodiment 1, and therefore, descriptions of the configurations, the operation, and the effect will be omitted. In FIGS. 14, 15, 17, and 18, the respective reference characters in FIGS. 3, 6, 7, and 8 with 100 added thereto are the same portions described in Embodiment 1.

Figure 15:
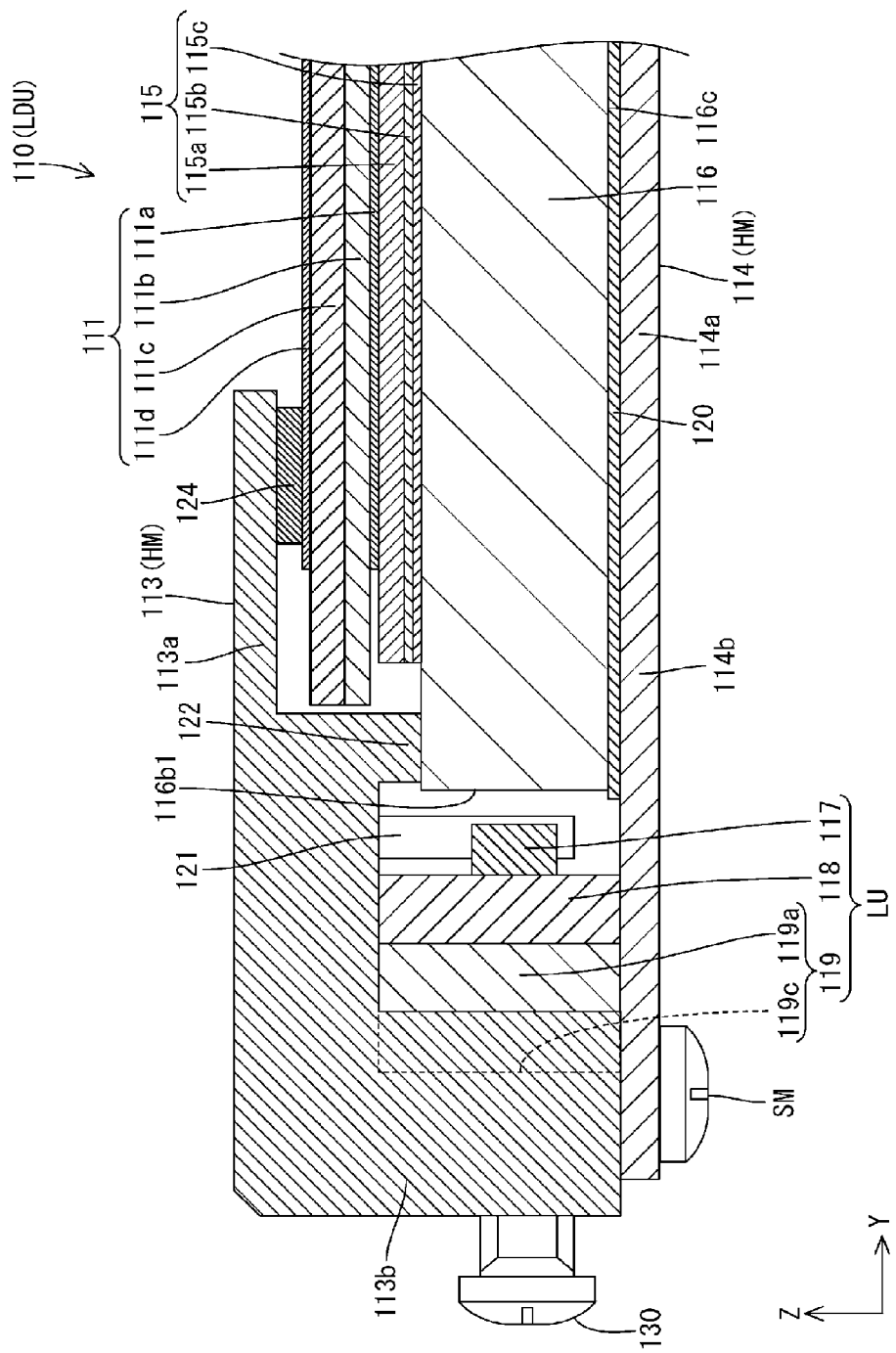
FIG. 15 is a cross-sectional view of main components of the liquid crystal display device 110 in which the vicinity of the adjusting screw 130 is magnified.
Figure 16:
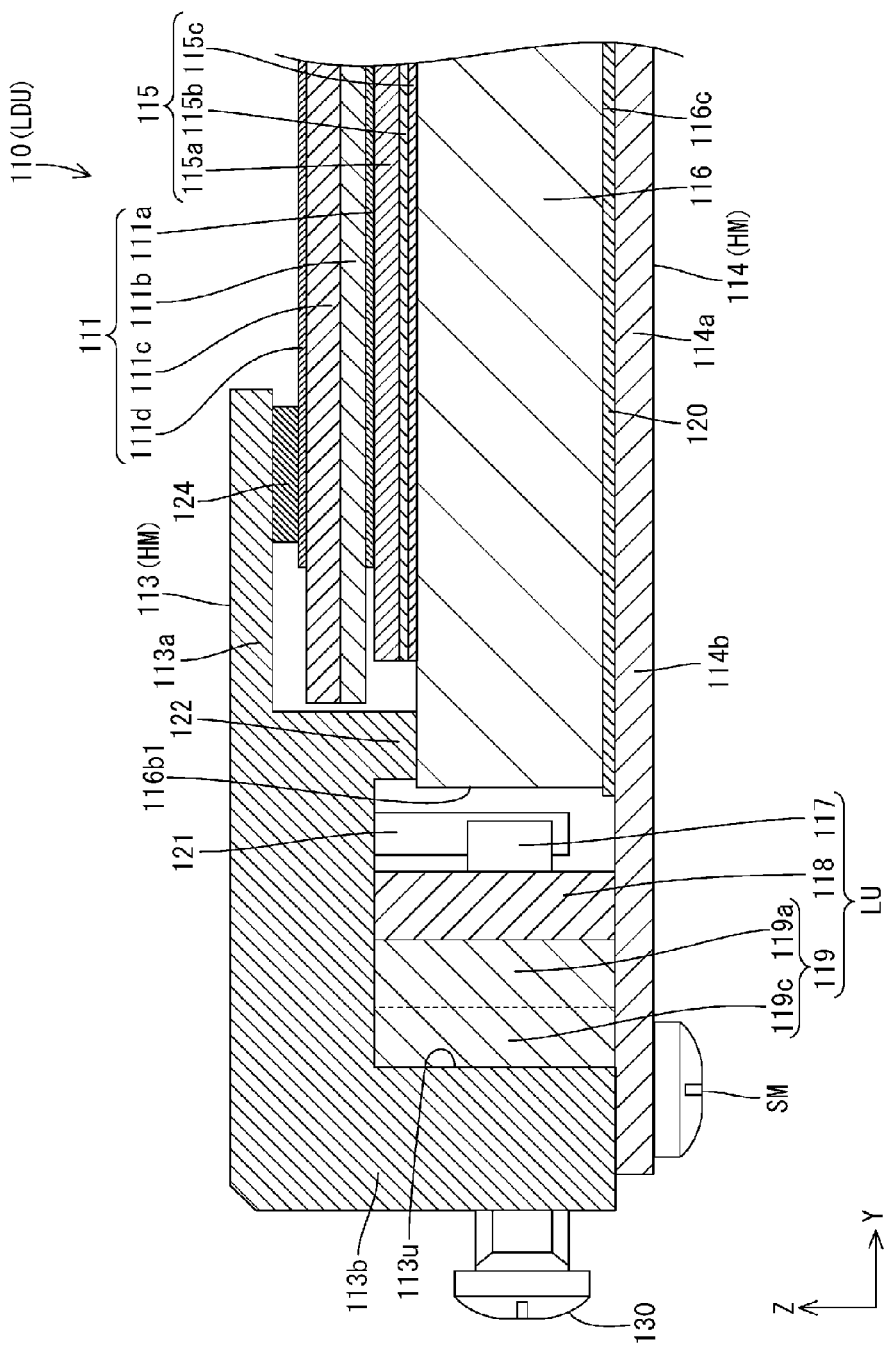
FIG. 16 is a cross-sectional view of main components in another cross-section of the liquid crystal display device 110 in which the vicinity of the adjusting screw 130 is magnified.
Figure 17:
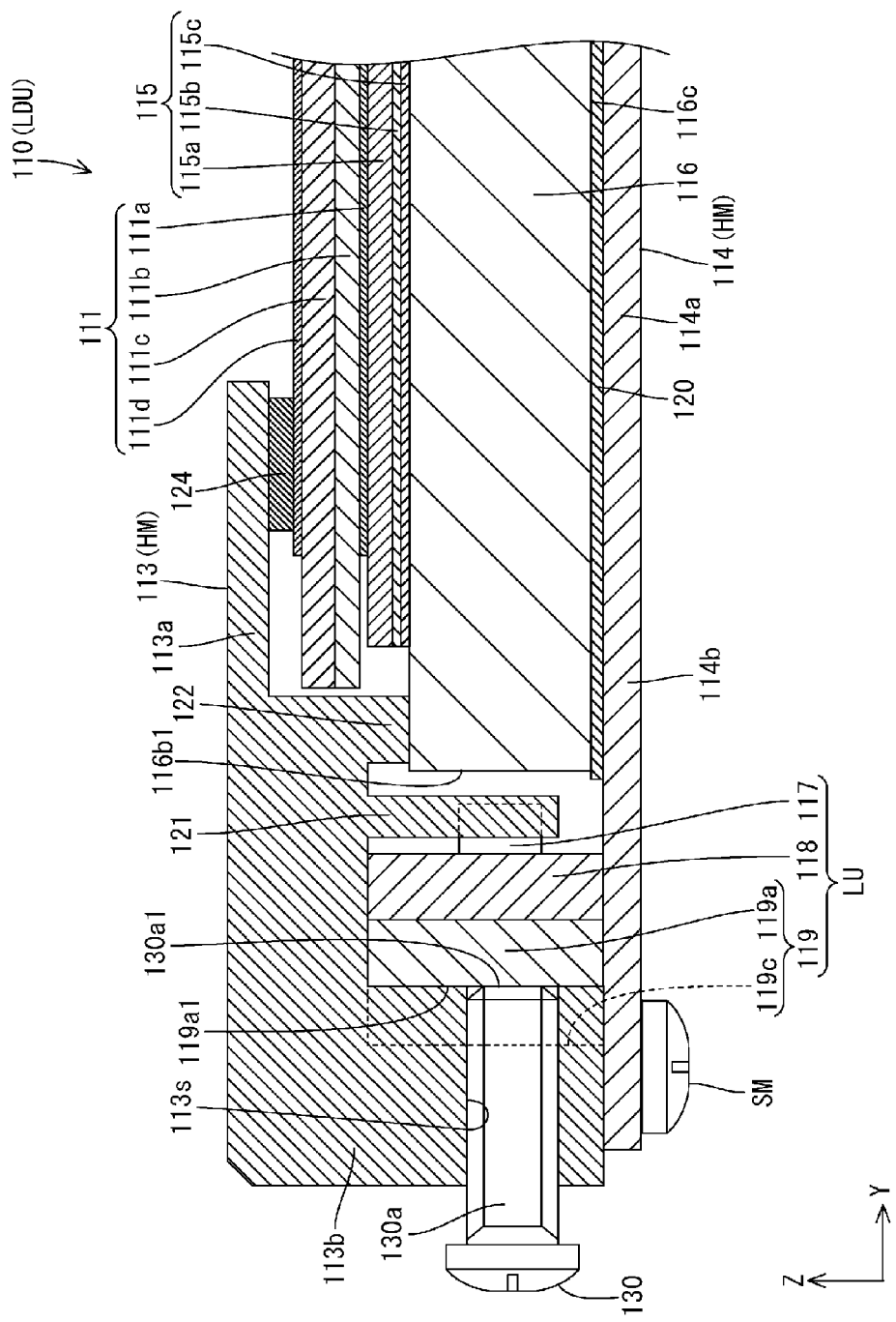
FIG. 17 is a cross-sectional view of main components in another cross-section of the liquid crystal display device 110 in which the vicinity of the adjusting screw 130 is magnified.
Figure 18:
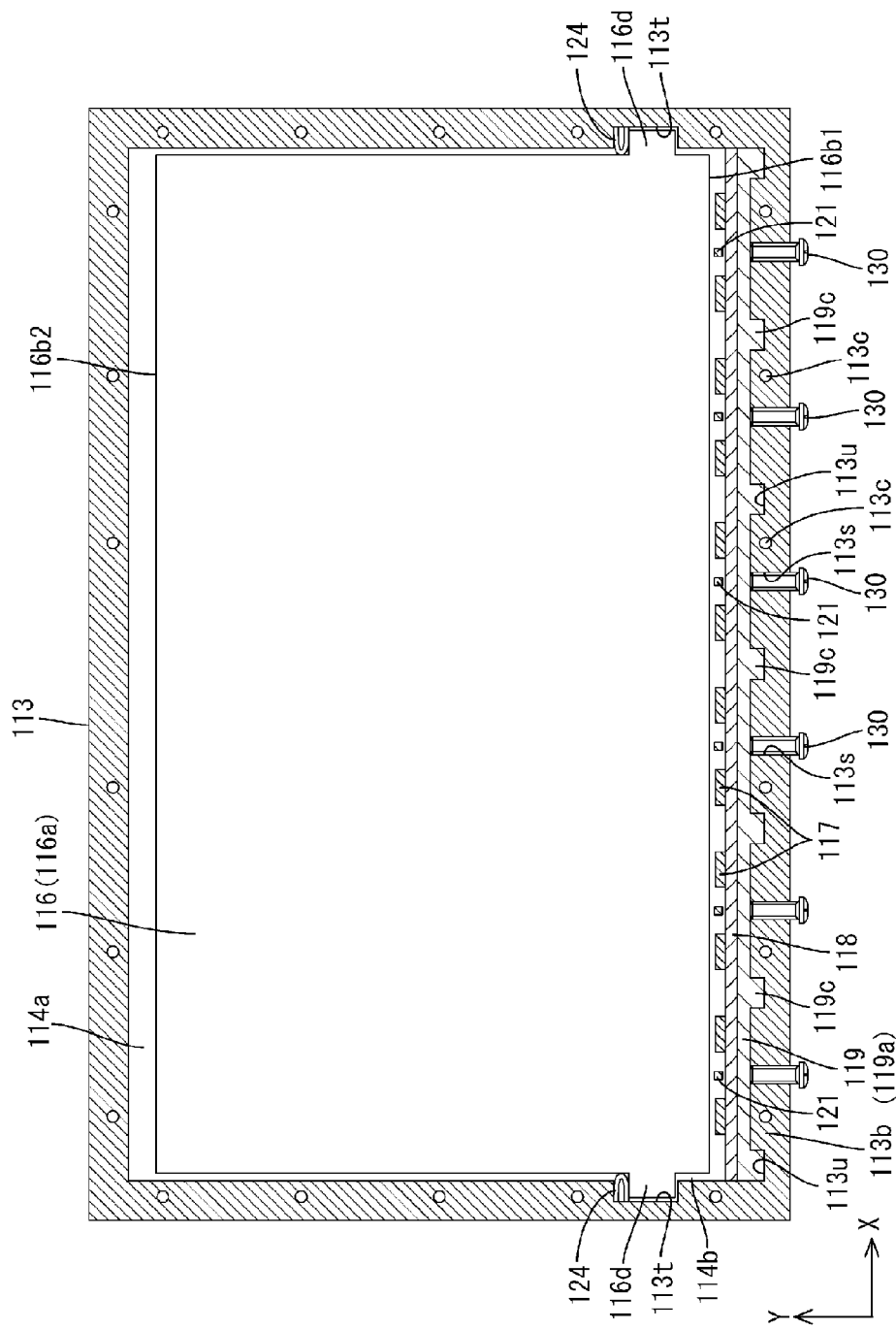
FIG. 18 is a horizontal cross-sectional view seen from the front side of the frame 113 housing the light guide plate 116.
Figure 19:
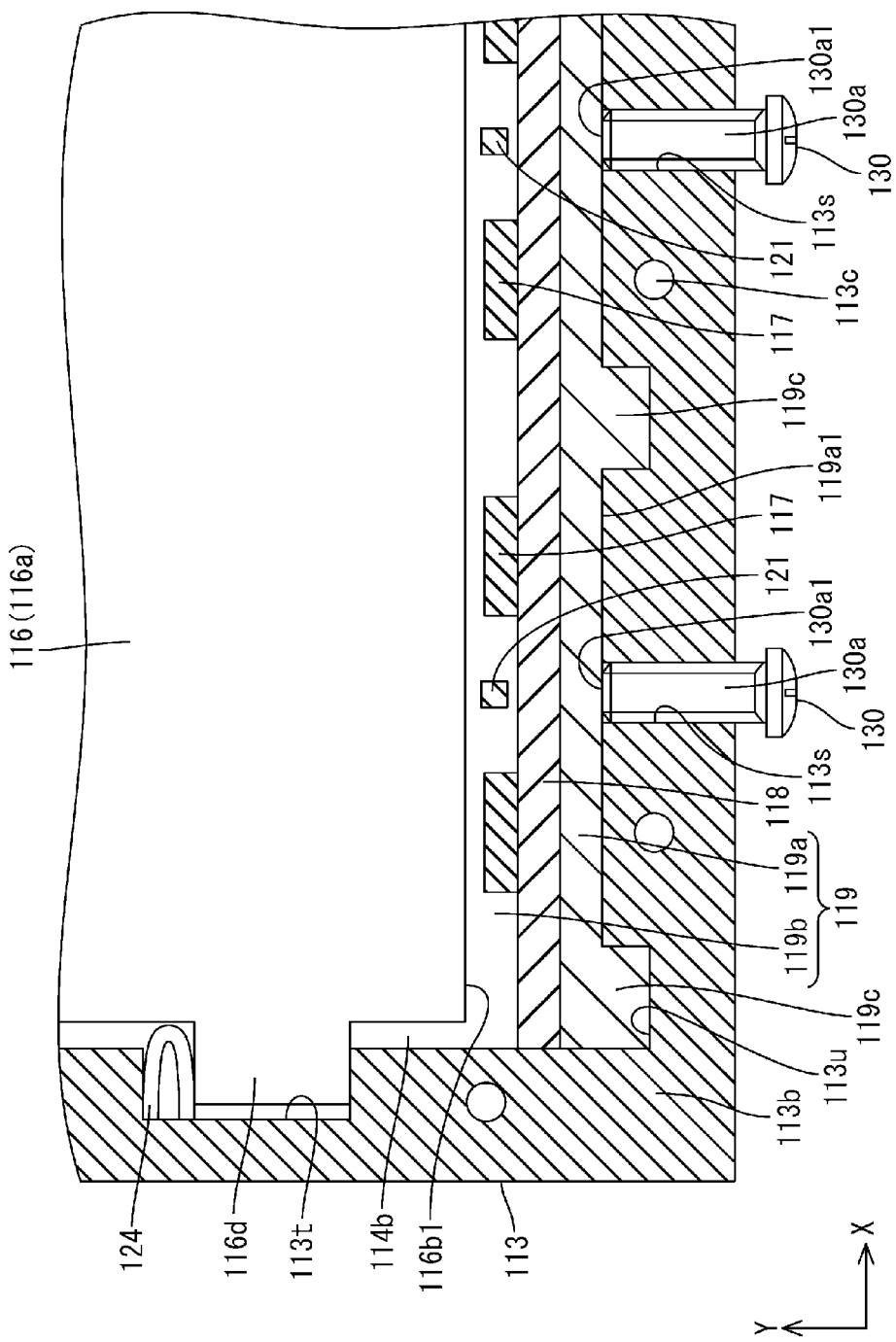
FIG. 19 is a horizontal cross-sectional view magnifying one corner of FIG. 18.

As shown in FIGS. 14 to 18, the heat dissipating member 119 of the liquid crystal display device 110 of Embodiment 2 does not have a heat dissipating section that is described in Embodiment 1, and on an outer side surface of an attaching section 119a (surface opposite to a side holding an LED substrate 118), a plurality of protrusions 119c that protrude from the outer side surface to the side wall 113b along the direction perpendicular (Y axis direction) to the light-receiving face 116b1 are provided. Each of the protrusions 119c has a pillar-shape extending along the vertical direction (thickness direction of the light guide plate 116, Z axis direction). The size of the extension of the protrusions 119c matches the size of the short side direction (Z axis direction) of the attaching section 119a and the size of the extension (size in the Y axis direction) is thinner than the thickness of the side wall 113b. Each of the protrusions 119c is provided between the respective adjusting screws 130 so as to be aligned with gaps therebetween. Meanwhile, the portion of the side wall 113b that faces the protrusion 119c has an engaging groove 113u that can engage the protrusion 119c. Each of the protrusions 119c is engaged to each of the engaging grooves 113u, and as a result, the heat dissipating member 119 is held by the second bottom plate 114b. FIG. 15 shows a cross-section along the Y axis direction of the portion that does not have the protrusion 119c and the penetrating hole 113s; FIG. 16 shows a cross-section along the Y axis direction of the portion having the protrusion 119c; and FIG. 17 shows a cross-section along the Y axis direction of the portion having the penetrating hole 113s.

Figure 20:
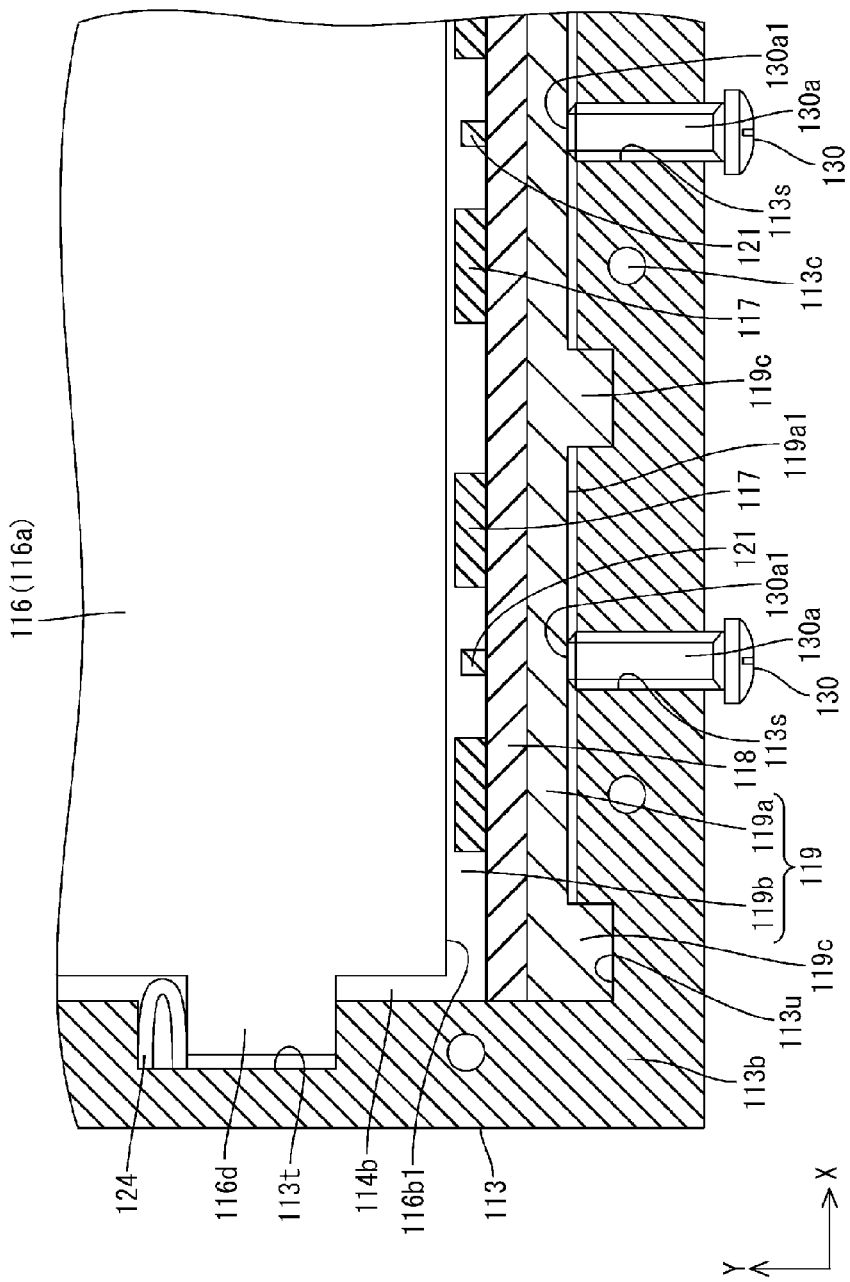
FIG. 20 is a horizontal cross-sectional view corresponding to FIG. 19, and is a horizontal cross-sectional view after the LED 17 is moved closer to the light-receiving face by the adjusting screw 130.

The liquid crystal display device 110 of Embodiment 2 holds the heat dissipating member 119 by having each of the protrusions 119c engaged to each of the engaging grooves 113u. Furthermore, because the protrusion 119c protrudes along the direction perpendicular (Y axis direction) to the light-receiving face 116b1, the heat dissipating member 119 can slide in a direction perpendicular (Y axis direction) to the light-receiving face 116b1 while being held with respect to the side wall 113b. As a result, even if the heat dissipating section is not included in the configuration of the heat dissipating member 119 in Embodiment 2 as it is in Embodiment 1, the LED substrate 118 can be pushed towards the light-receiving face 116b1 by screwing in the adjusting screw 130, and as shown in FIG. 20, each of the LEDs 117 can be moved towards the light-receiving face 116b1. Therefore, even after the liquid crystal display device 110 is manufactured, the luminance can be adjusted.

Modification Example of Embodiment 2

Figure 21:
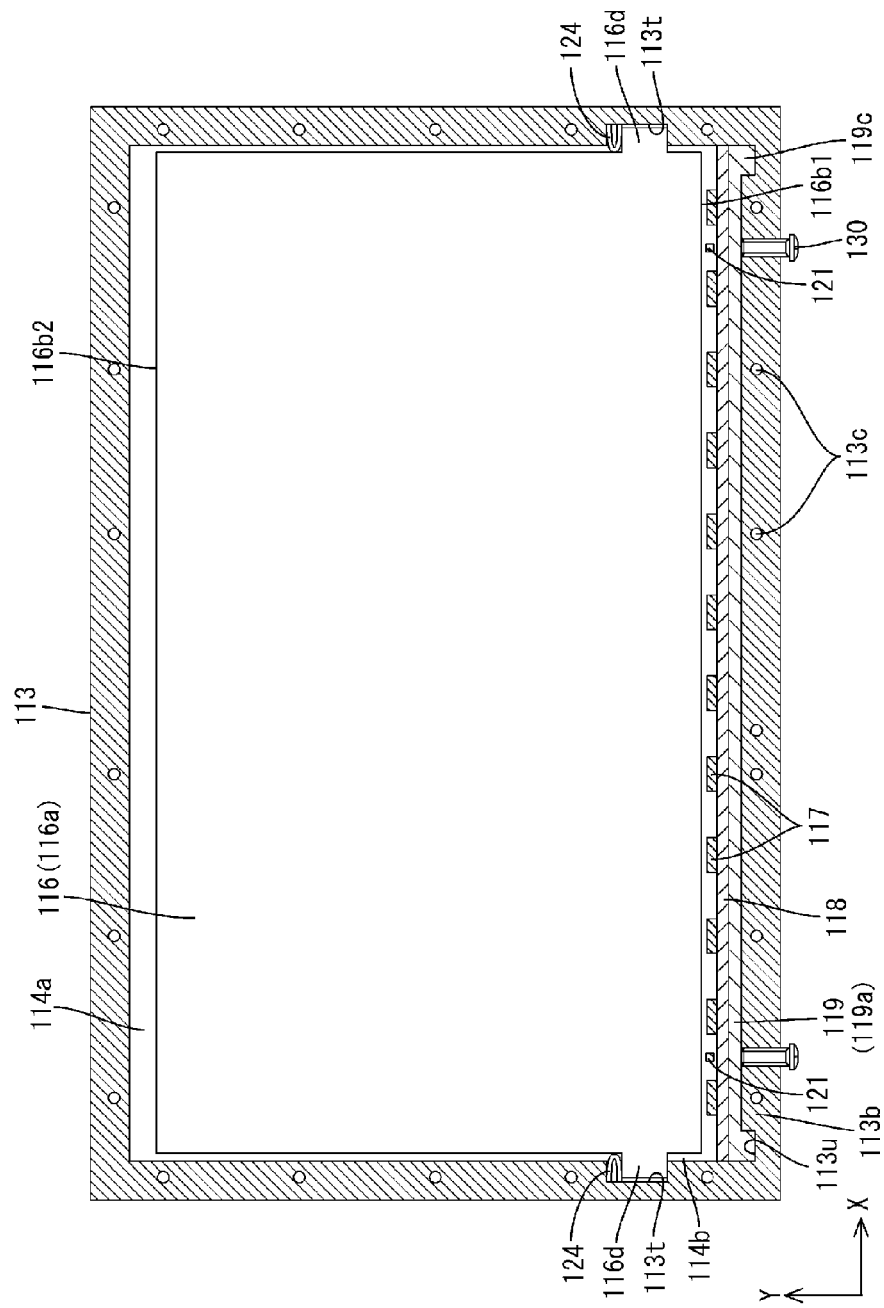
FIG. 21 is a horizontal cross-sectional view corresponding to FIG. 18, and is a horizontal cross-sectional view of a modification example of Embodiment 2.

Next, a modification example of Embodiment 2 will be described. The modification example shown in FIG. 21 has a different number of adjusting screws 130 compared to that of Embodiment 2. Other elements are similar to those of Embodiment 1, and therefore, descriptions of the configurations, the operation, and the effect will be omitted. As shown in FIG. 21, the modification example of Embodiment 2 has a pair of the adjusting screws 130 and 130 that are respectively disposed on the two edges of the LED substrate 118 in the long side direction (X axis direction). As a result, in a similar manner to the modification example of Embodiment 1, while being capable of adjusting the luminance even after manufacturing the liquid crystal display device 110, the number of adjusting screws 130 disposed can be reduced compared to Embodiment 2, and thus the manufacturing process can be simplified and the material cost related to the adjusting screws 130 can be reduced.

Embodiment 3

Embodiment 3 will be described with reference to the drawings. Embodiment 3 differs from Embodiment 1 in that a heat-dissipating member 219 is attached to a chassis 214. Other elements are similar to those of Embodiment 1, and therefore, descriptions of the configurations, the operation, and the effect will be omitted. Parts in FIG. 22 that have 200 added to the reference characters of FIG. 7 are the same as these parts described in Embodiment 1.

Figure 22:
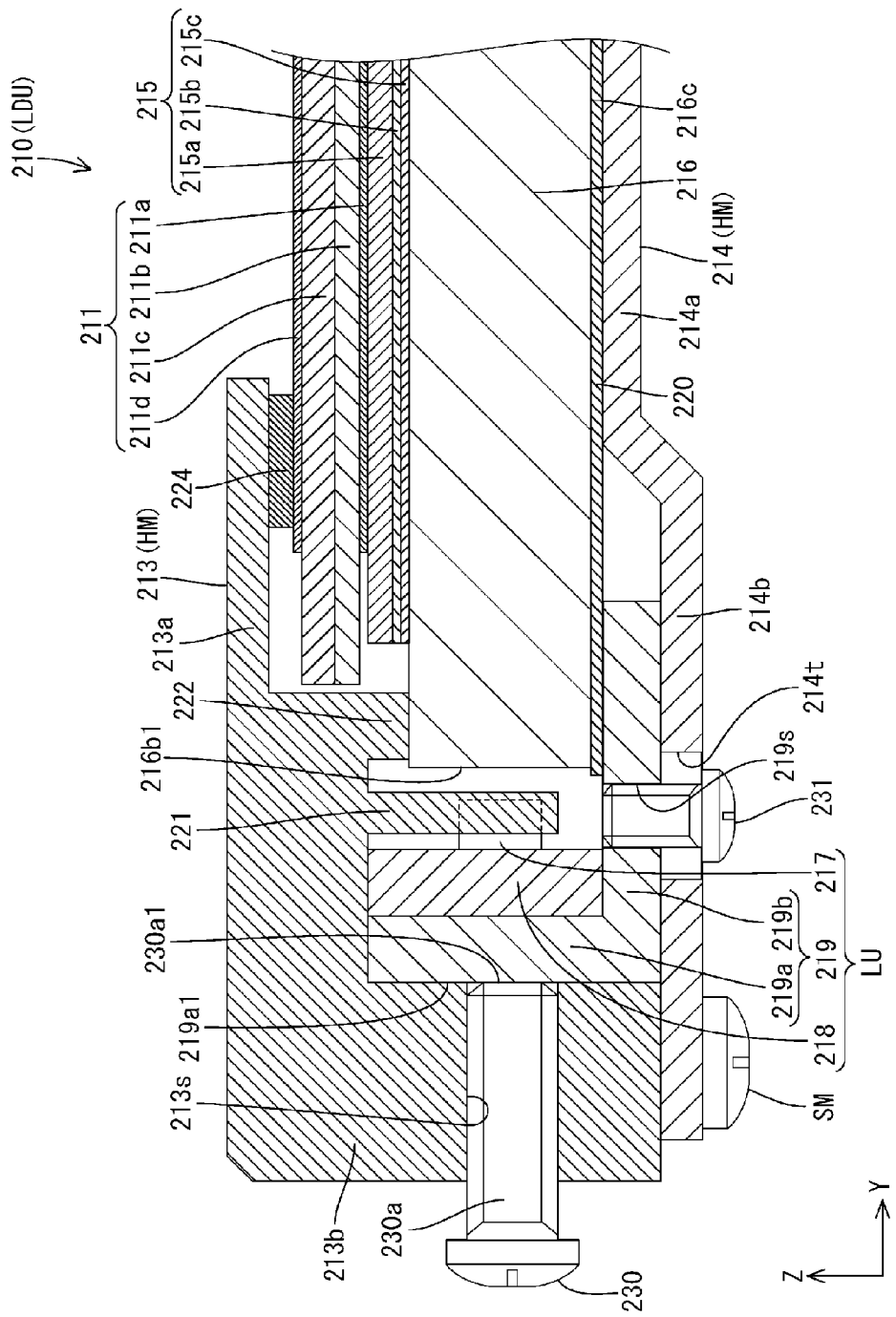
FIG. 22 is a cross-sectional view of main components of a liquid crystal display device 210 in which the vicinity of an adjusting screw 230 of Embodiment 3 is magnified.

As shown in FIG. 22, in the liquid crystal display device 210 of Embodiment 3, a heat dissipating section 219b of the heat dissipating member 29 has a heat dissipating section side screw hole 219s with a circular opening that penetrates the surface of the heat dissipating section 219 in the thickness direction (Z axis direction). Meanwhile, an oval screw hole 214t that has an oval shape is provided in the portion of a second bottom plate 214b of the chassis 214 overlapping the heat dissipating section side screw hole 219s in the vertical direction (Z axis direction). The screw hole 214t has the long axis thereof in a direction perpendicular to the light-receiving face 216b1 while penetrating the second bottom plate 214b in the thickness direction (Z axis direction). An attaching screw 231 is inserted into the oval screw hole 214t and the heat dissipating section side screw hole 219s in that order from the rear side of the second bottom plate 214b of the chassis 214. As a result, the heat dissipating section 219b of the heat dissipating 219 member is held on the chassis 214. Furthermore, the oval screw hole in which the attaching screw 231 is inserted has an oval shape, and the heat dissipating section 219b (heat dissipating member 219) attached to the chassis 214 by the attaching screw 231 can be moved within the length of the oval screw hole 214t in the long axis. In other words, the heat dissipating member 219 is provided so as to be able to slide along the chassis 214 in the direction perpendicular (Y axis direction) to the light-receiving face 216b of the light guide plate 216. The width in the short axis direction of the opening of the oval screw hole 214t is smaller than the diameter of the screw head of the attaching screw 231, and thus the attaching screw 231 will not enter the oval screw hole 214t. Because Embodiment 3 has this type of configuration, even if the tip of the heat dissipating section 219b is not sandwiched between the chassis 214 and the light guide plate 216, by screwing in the screw head of the adjusting screw 230, the heat dissipating member 219 can be moved closer to the light-receiving face 216b1 and the distance between the LEDs 217 and the light-receiving face 216b1 can be shortened. Then, the heat dissipating member 219 can be fixed to the chassis 214 by the attaching screw 231.

Embodiment 4

Embodiment 4 will be described with reference to the drawings. The configuration for fixing the position of the light guide plate 316 in Embodiment 4 is different from that in Embodiment 1. Other elements are similar to those of Embodiment 1, and therefore, descriptions of the configurations, the operation, and the effect will be omitted. Parts in FIG. 23 that have 300 added to the reference characters of FIG. 8 are the same as these parts described in Embodiment 1.

Figure 23:
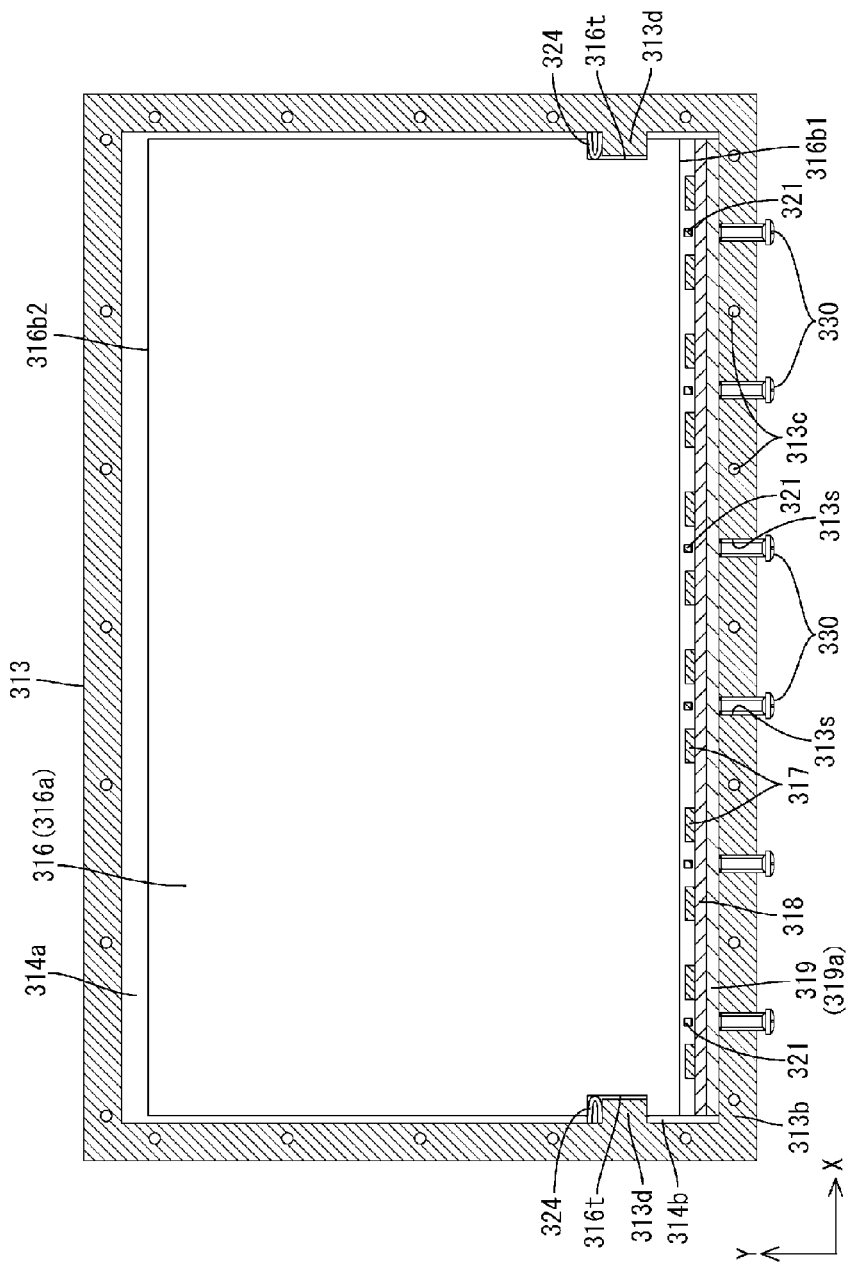
FIG. 23 is a horizontal cross-sectional view of Embodiment 4 seen from a front side of a frame 313 that houses a light guide plate 316 of Embodiment 4.

As shown in FIG. 23, the liquid crystal display device of Embodiment 4 has a pair of position fixing protrusions 313d on side walls 313b of the frame 313 respectively facing both sides of the light guide plate 316 in the short side thereof that protrude towards the light guide plate 316 from two locations in the vicinity of the light-receiving face 316b1. Meanwhile, position fixing recesses 316t having a recessed shape that has an opening corresponding to the side faces of the position fixing protrusion 313d and facing the position fixing protrusion 313d are respectively provided in locations corresponding to the position fixing protrusions 313d on both side faces in the short side of the light guide plate 316. In other words, the position of the position fixing recesses 316t and the position fixing protrusions 313d are reversed compared to the configuration in Embodiment 1. The position and the configuration of the spring plates 324 is the same as the configuration in Embodiment 1. Even in such a configuration, the position of the light guide plate 316 can be fixed along the surface direction (X-Y plane surface direction) thereof between the frame 313 and the chassis 314.

Embodiment 5

Figure 11:
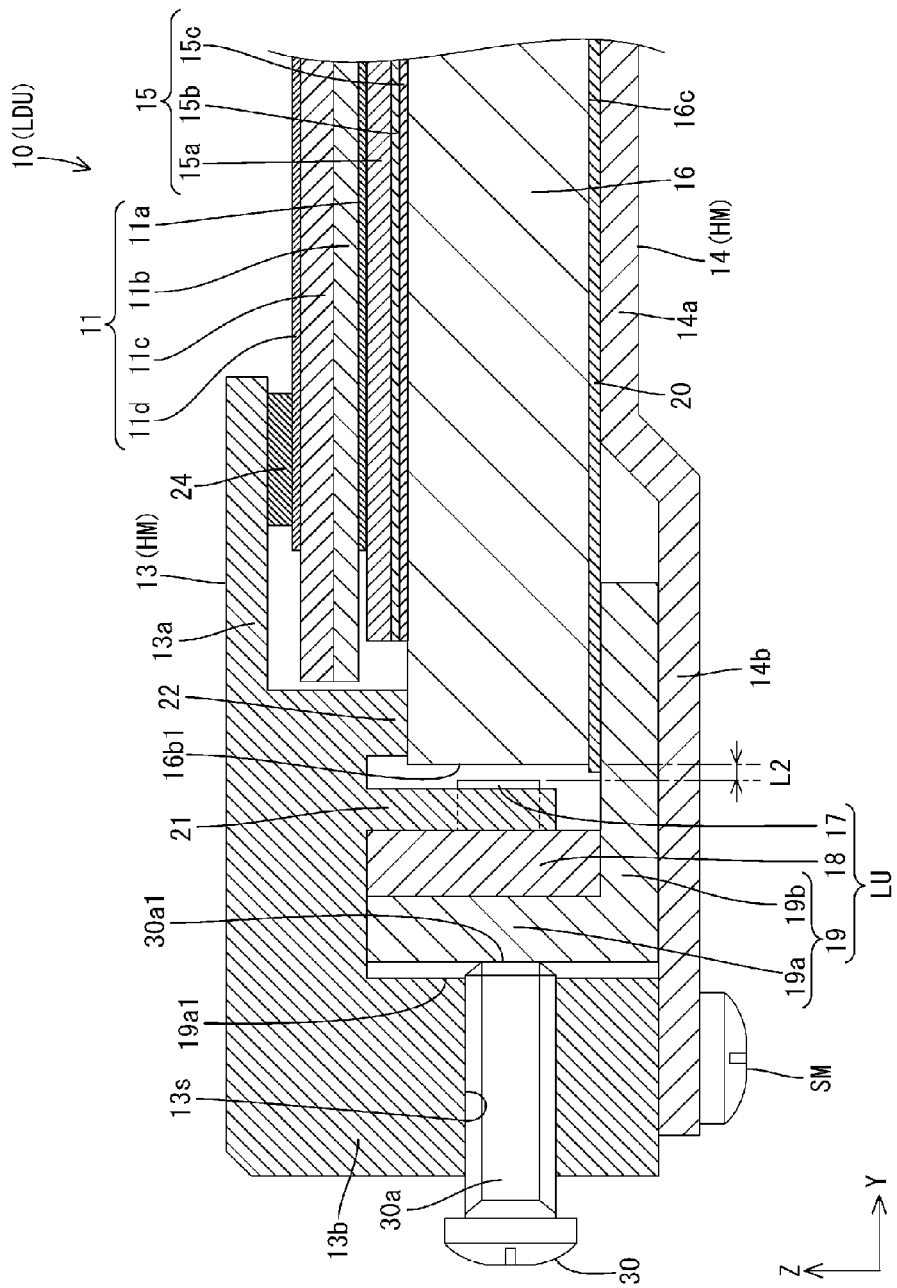
FIG. 11 is a cross-sectional view of main components corresponding to FIG. 7, and is a cross-sectional view of main components after the LED 17 is moved closer to the light-receiving face by the adjusting screw 30.
Figure 12:
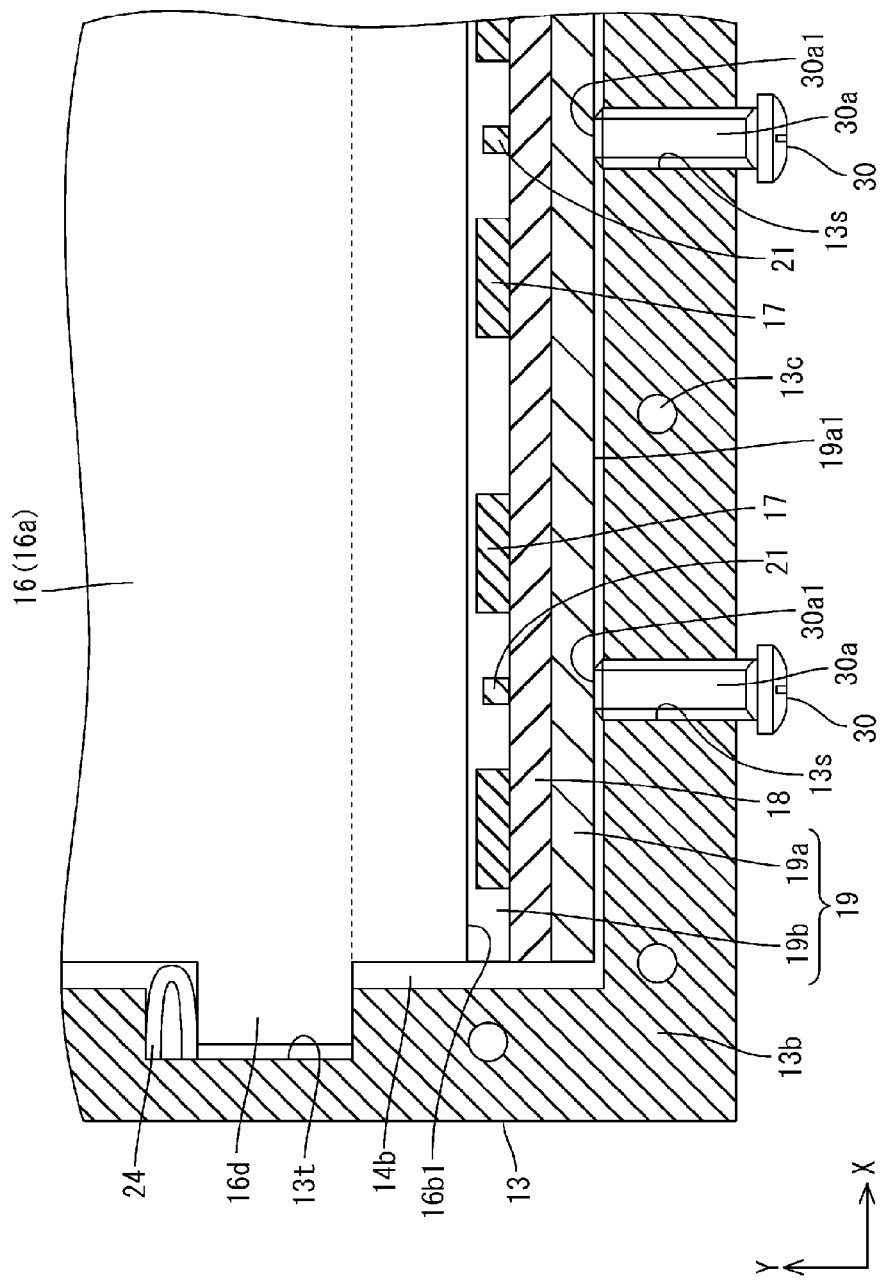
FIG. 12 is a horizontal cross-sectional view of main components corresponding to FIG. 9, and is a horizontal cross-sectional view of main components after the LED 17 is moved closer to the light-receiving face by the adjusting screw 30.

Embodiment 5 will be described with reference to the drawings. Embodiment 5 is different from Embodiment 1 in that the adjusting spring plates (an example of elastic members) 425 are disposed between a heat dissipating section 419b of a heat dissipating member 419 and a chassis 414. Other elements are similar to those of Embodiment 1, and therefore, descriptions of the configurations, the operation, and the effect will be omitted. Reference characters in FIGS. 24 to 26 in which 400 are added to the respective reference characters in FIGS. 3, 7, and 11 are of the same parts described in Embodiment 1.

Figure 24:
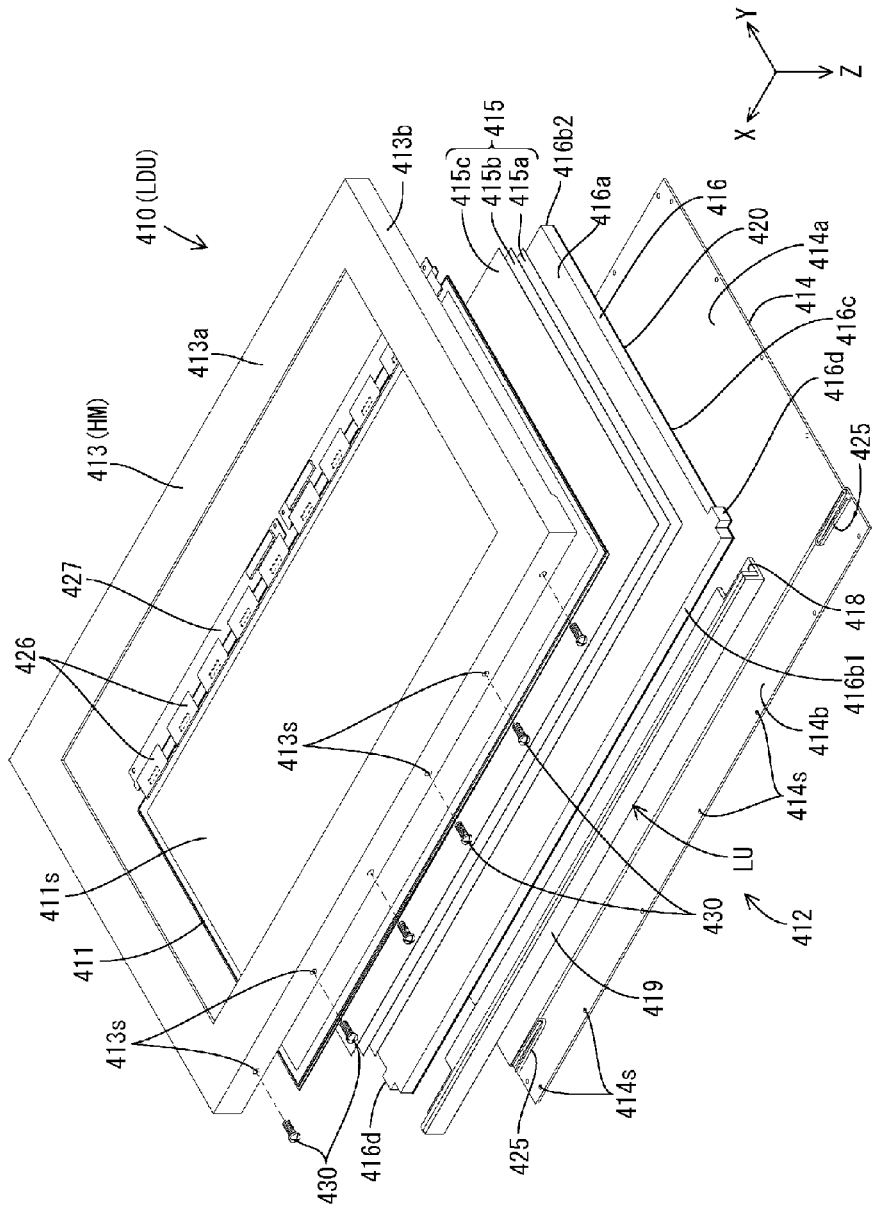
FIG. 24 is an exploded perspective view showing a schematic configuration of the liquid crystal display unit LDU forming the liquid crystal display device 410 of Embodiment 5.
Figure 25:
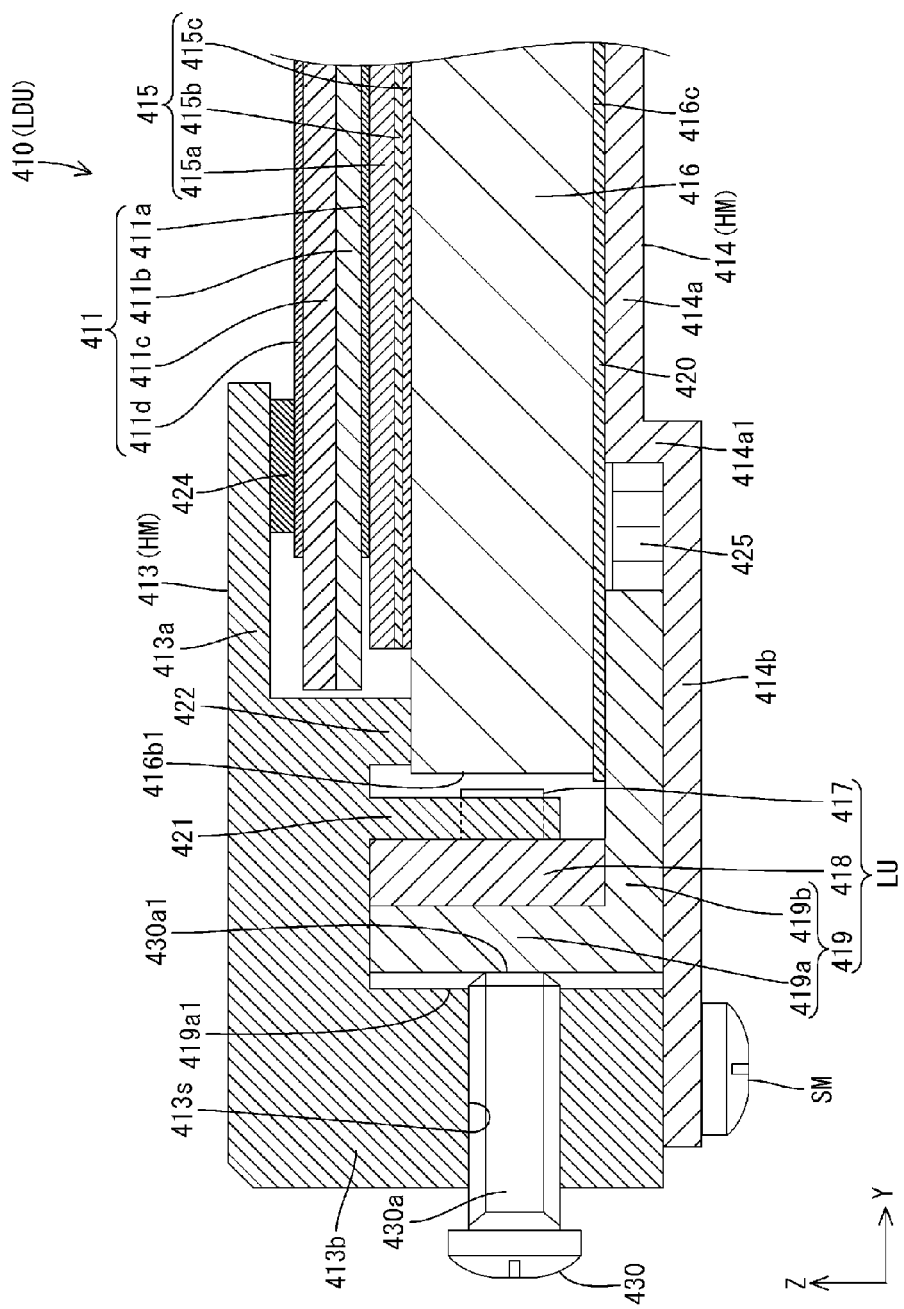
FIG. 25 is a cross-sectional view of main components after an LED 417 is moved closer to a light-receiving face 416$b$1 by the adjusting screw 430.
Figure 26:
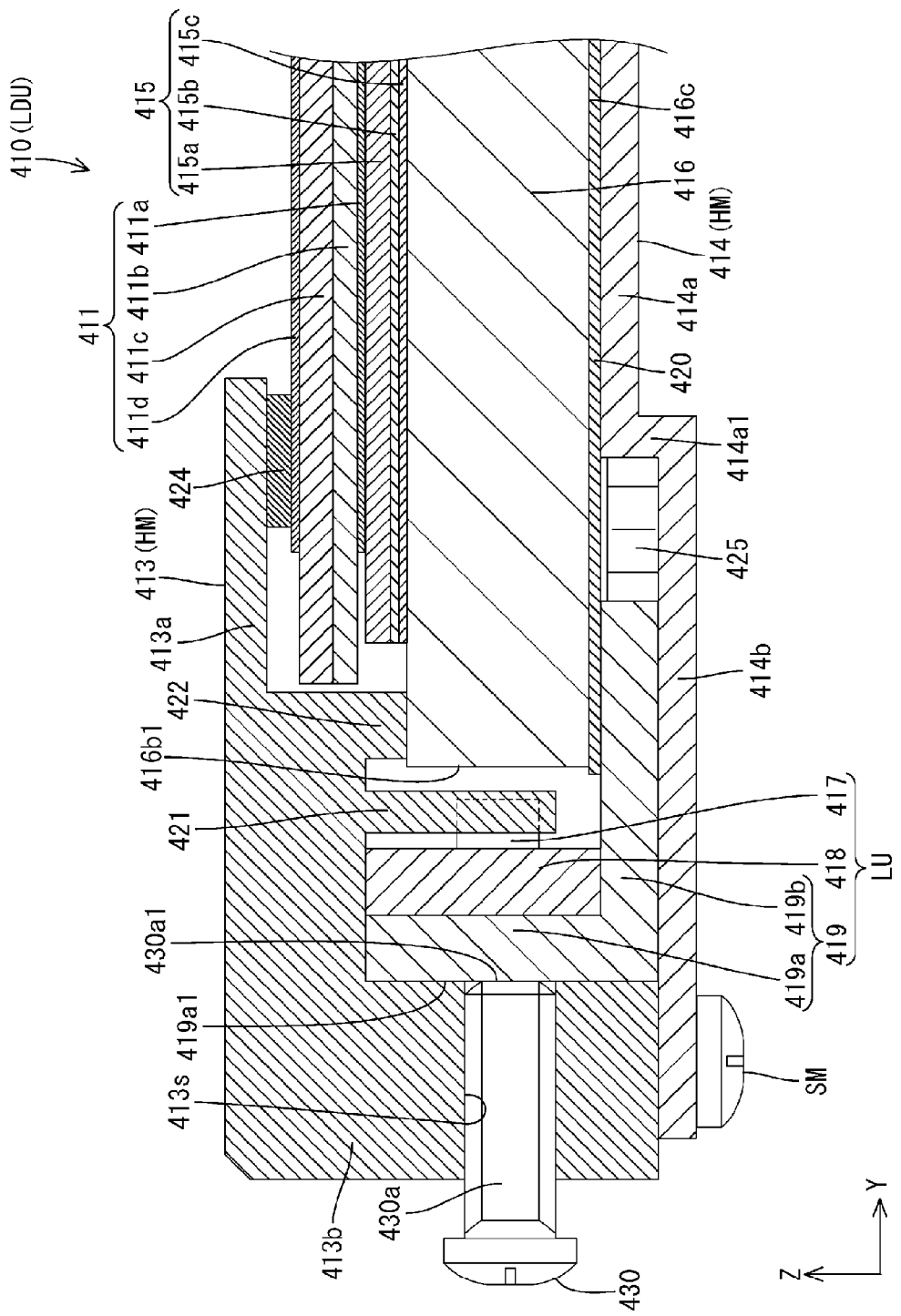
FIG. 26 is a cross-sectional view of main components when the adjusting screw 430 is loosened from the state in FIG. 24 (when LED 417 is moved away from the light-receiving face 416$b$1).

As shown in FIGS. 24 and 25, the liquid crystal display device 410 of Embodiment 5 has a side wall 414a1 that is a step provided between the first bottom plate 414a and the second bottom plate 414b of the chassis 414, and the side wall 414a1 rises so as to intersect a surface of the first bottom plate 414a and a surface of the second bottom plate 414b. Furthermore, a pair of adjusting plate springs 425 and 425 are disposed between the side walls 414a1 that are steps and the tips of the heat dissipating section 419b of both edges in the long side direction (X axis direction) of the heat dissipating member 419 (FIG. 24). The pair of adjusting plate springs 425 and 425 are disposed on both edges of the long side direction (long side direction of the chassis 414) of the LED substrate 418, and thus are elastically deformable in the direction perpendicular (Y axis direction) to the light-receiving face 416b1. In addition, the portion of the heat dissipating section 419b of the heat dissipating member 419 excluding both edge portions in the long side direction (X axis direction) extends towards the center (inner side Y axis direction) of the light guide plate 416. As a result, the pair of adjusting plate springs 425 and 425 is suppressed from shifting inwards in the long side direction (X axis direction) of the heat dissipating section 419b.

The pair of adjusting plate springs 425 and 425 are respectively disposed so as to abut the tip of a bottom surface portion 419b and the side wall 414a1 when the adjusting screw 430 is not screwed in. As a result, if the adjusting screw 430 is screwed in to move the heat dissipating member 419 towards the light-receiving face 416b1, then the respective adjusting plate springs 425 and 425 are compressed and store elastic energy therein (state shown in FIG. 25). If the adjusting screw 430 is loosened from this state (if the adjusting screw 430 is twisted such that the heat dissipating member 419 moves towards a side opposite to the light-receiving face 416b1), then the respective adjusting plate springs 425 and 425 perform elastic recovery. As a result, the heat dissipating member 419 is pushed by the respective adjusting plate springs 425 and 425 towards the side opposite the light-receiving face 416b1, and the heat dissipating member 419 moves away from the light-receiving face 416b1. In other words, the LEDs 417 move away from the light-receiving face 416b1 (state shown in FIG. 26). By having this type of configuration, if the LEDs 417 are moved too close to the light-receiving face 416b1 by screwing in the adjusting screw 430, then the LEDs 417 can be moved away from the light-receiving face 416b1, and thus the luminance of the display surface 411s of the liquid crystal panel 411 can be adjusted with high precision.

Modification examples of the respective embodiments above will be described below.

(1) In the respective embodiments above, examples in which the pillar-shaped member is a screw is provided, but the pillar-shaped member may be a small screw or other pillar-shaped members. Even in such cases, the screw head of the pillar-shaped member can be pushed in towards the side wall so as to move the heat dissipating member towards the light-receiving face, thereby adjusting the distance between the LEDs and the light-receiving face.

(2) In the respective embodiments above, examples in which the cover member forming the exterior portion of the television not having a penetrating hole was shown, but a penetrating hole may also be provided in a location of the cover member overlapping the penetrating hole provided in the side wall, and the adjusting screw may penetrate both the penetrating hole in the side wall and the penetrating hole in the cover member. In this manner, even after the television receiver is assembled, the luminance can be adjusted by twisting the adjusting screw from the outside of the cover member.

(3) In the respective embodiments above, examples of the display device not having a cabinet are provided, but the display device may have a cabinet. In this case, the chassis may extend from the side wall, and at the same time, a penetrating hole may be provided in the side wall.

(4) In the respective embodiments above, configurations in which an LED unit is only provided on a side facing one side face in the long side of the light guide plate are shown as an example, but the configuration may have LED units respectively disposed on both side faces in the long side of the light guide plate. Otherwise, the LED unit may be disposed so as to face the side face of the light guide plate in the short side thereof. In this case, penetrating holes may be respectively provided on the side walls on which LED units are disposed, and adjusting screws may be disposed in the respective penetrating holes.

(5) The number, the position, the shape, or the like of penetrating holes are not limited to those in the respective embodiments and can be changed as appropriate.

(6) The number, the position, the shape, or the like of the adjusting screws are not limited to those in the respective embodiments and can be changed as appropriate.

(7) In addition to each embodiment described above, modifications can be made as appropriate to the configuration of the heat dissipating member.

(8) In the respective embodiments above, a liquid crystal display device using a liquid crystal panel as a display panel was shown as an example, but the present invention is also applicable to a display device that uses another type of display panel.

(9) In the respective embodiments above, a television receiver that includes a tuner was shown as an example, but the present invention is also applicable to a display device without a tuner.

Embodiments of the present invention were described above in detail, but these are only examples, and do not limit the scope defined by the claims. The technical scope defined by the claims includes various modifications of the specific examples described above.

Also, the technical elements described in the present specification or shown in the drawings realize technical utility each on their own or through a combination of various technical elements, and are not limited to the combinations defined by the claims at the time of filing. Also, the techniques described in the present specification or shown in the drawings can accomplish a plurality of objects simultaneously, and each one of the objects on its own has technical utility.

DESCRIPTION OF REFERENCE CHARACTERS

TV television receiver
LDU liquid crystal display unit
PWB power supply board
MB main board
CTB control board
CV cover member
ST stand
LU LED unit
SU spacer member
10, 110, 210, 410 liquid crystal display device
11, 111, 211, 411 liquid crystal panel
12, 112, 212, 412 backlight device
13, 113, 213, 313, 413 frame
13s, 113s, 213s, 313s, 413s penetrating hole
14, 114, 214, 414 chassis
15, 115, 215, 415 optical members
16, 116, 216, 316, 416 light guide plate
17, 117, 217, 317, 417 LED
18, 118, 218, 318, 418 LED substrate
19, 119, 219, 319, 419 heat dissipating member
19a, 119a, 219a, 319a, 419a attaching section
19b, 219b, 419b heat dissipating section
20, 120, 220, 420 reflective sheet
21, 121, 221, 321, 421 restricting portion
30, 130, 230, 330, 430 adjusting screw
119c protrusion

What is claimed is:

1. A display device, comprising:
a light source;
a display panel that performs display using light from the light source;
a light guide plate disposed behind the display panel to guide light from the light source towards the display panel, said light guide plate having a light-emitting surface on one surface thereof and having a light-receiving face on at least one side face thereof, said light-emitting surface facing a side of the display panel opposite to a display surface side thereof, said light-receiving face facing the light source;
a chassis having at least a bottom plate, said chassis being disposed behind the light guide plate;
a frame disposed on the display surface side of the display panel, said frame and the chassis housing therebetween the display panel, the light source, and the light guide plate;
a light source substrate having the light source disposed on a front surface thereof that faces and is in parallel to the light-receiving face of the light guide plate;
a substrate holding member that can slide in a direction perpendicular to the light-receiving face relative to the bottom plate of the chassis, the substrate holding member including at least a plate-shaped portion holding a rear surface of the light source substrate;
a side wall facing the light-receiving face across the plate-shaped portion of the substrate holding member, said side wall extending from either the chassis or the frame and having a penetrating hole that penetrates the side wall in a thickness direction thereof; and
a pillar-shaped member with one end thereof penetrating the penetrating hole engaging the plate-shaped portion of the substrate holding member so that the substrate holding member can be moved towards the light-receiving face by moving another end of the pillar-shaped member towards said side wall,
wherein the frame is constituted of a panel pressing portion that presses the display panel from the display surface side, and a side wall portion that protrudes from a periphery of the panel pressing portion towards the chassis,
wherein either the light guide plate or the side wall portion has a protrusion protruding towards another of the light guide plate or the side wall portion, a recess being provided at a location facing this protrusion and having an opening that corresponds to said protrusion, said recess being able to engage said protrusion,
wherein a gap is provided between the protrusion and the recess, and
wherein a plate spring that is elastically deformable is disposed in said gap in a direction perpendicular to the light-receiving face of the light guide plate.

2. The display device according to claim 1, further comprising:
a restricting portion protruding from a portion of the frame exposed between the light source substrate and the light-receiving face towards the chassis, said restricting portion restricting the light source substrate from moving towards the light-receiving face by abutting the front surface of the light source substrate.

3. The display device according to claim 2, wherein said restricting portion is disposed at a position that matches a position of the pillar-shaped member in a direction along the front surface of the light source substrate.

4. The display device according to claim 1,
wherein said light source substrate has a rectangular shape,
wherein a plurality of the light sources are aligned in a straight line along a long side direction of the light source substrate, and
wherein a plurality of the pillar-shaped members are aligned along the long side direction of the light source substrate.

5. The display device according to claim 1,
wherein said light source substrate has a rectangular shape,
wherein a plurality of the light sources are aligned in a straight line along a long side direction of the light source substrate, and
wherein two of the pillar-shaped members are respectively disposed only in locations corresponding to two edges of the light source substrate in the long side direction.

6. The display device according to claim 4, wherein each of the pillar-shaped members is disposed in a location corresponding to a gap between adjacent light sources.

7. The display device according to claim 1,
wherein the penetrating hole has a groove, and
wherein the pillar-shaped member is a screw that can engage the groove.

8. The display device according to claim 1, wherein the substrate holding member further includes a bottom surface portion that extends in a plate shape along the bottom plate of the chassis from an end of the plate shaped portion abutting said bottom plate, a surface of said bottom surface portion abutting the bottom plate, and said bottom surface portion having at least a portion sandwiched between the light guide plate and the bottom plate of the chassis.

9. The display device according to claim 1,
wherein the substrate holding member further includes a bottom surface portion that extends in a plate shape along the bottom plate of the chassis from an end of the plate shaped portion abutting said bottom plate, a surface of said bottom surface portion abutting the bottom plate, and
wherein either the bottom surface portion or the bottom plate has an oval hole having the direction perpendicular to the light-receiving face being a long axis thereof, said oval hole being a penetrating hole for inserting a fastener for attaching the bottom surface portion to the chassis.

10. The display device according to claim 8,
wherein a step is provided on the bottom plate, and
wherein an elastic member is disposed between the bottom surface portion of the substrate holding member and a side wall forming the step and contacts said side wall and said bottom surface portion, said elastic member being able to elastically deform in the direction perpendicular to the light-receiving face.

11. The display device according to claim 1,
wherein the substrate holding member further includes a protrusion protruding from a rear surface thereof opposite to a side of the plate shaped portion holding the light source substrate, said protrusion protruding towards the side wall of the frame or the chassis in the direction perpendicular to the light-receiving face, and
wherein the side wall has an engaging groove that can engage the protrusion.

12. The display device according to claim 1, wherein the display panel is a liquid crystal panel having liquid crystal.

13. A television receiver, comprising:
the display device according to claim 1.

14. The display device according to claim 5, wherein each of the pillar-shaped members is disposed in a location corresponding to a gap between adjacent light sources.

* * * * *